(12) United States Patent
Zhang et al.

(10) Patent No.: US 11,939,481 B2
(45) Date of Patent: Mar. 26, 2024

(54) NANOSURFACTANT FORMULATIONS AND USE THEREFOR

(71) Applicant: University of Notre Dame du Lac, South Bend, IN (US)

(72) Inventors: Yanliang Zhang, South Bend, IN (US); Minxiang Zeng, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 70 days.

(21) Appl. No.: 17/357,805

(22) Filed: Jun. 24, 2021

(65) Prior Publication Data

US 2021/0403739 A1 Dec. 30, 2021

Related U.S. Application Data

(60) Provisional application No. 63/043,963, filed on Jun. 25, 2020.

(51) Int. Cl.
| | |
|---|---|
| *C09D 11/38* | (2014.01) |
| *C09D 11/033* | (2014.01) |
| *C09D 11/037* | (2014.01) |
| *C09D 11/322* | (2014.01) |
| *C09D 11/52* | (2014.01) |
| *G01J 1/42* | (2006.01) |
| *B82Y 15/00* | (2011.01) |
| *B82Y 40/00* | (2011.01) |

(52) U.S. Cl.
CPC ............ *C09D 11/38* (2013.01); *C09D 11/033* (2013.01); *C09D 11/037* (2013.01); *C09D 11/322* (2013.01); *C09D 11/52* (2013.01); *G01J 1/42* (2013.01); *B82Y 15/00* (2013.01); *B82Y 40/00* (2013.01)

(58) Field of Classification Search
CPC ..................................................... C09D 11/38
See application file for complete search history.

(56) References Cited

U.S. PATENT DOCUMENTS

2017/0050856 A1* 2/2017 Ming .................... C01B 32/194
2018/0327618 A1* 11/2018 McManus ............. C09D 11/30

FOREIGN PATENT DOCUMENTS

CN          110655829 A      1/2020

OTHER PUBLICATIONS

Agarwala et al., "Wearable Bandage-Based Strain Sensor for Home Healthcare: Combining 3D Aerosol Jet Printing and Laser Sintering", ACS Sens., 2019, 4, pp. 218-226.
Anichini et al., "Chemical sensing with 2D materials", Chem. Soc. Rev., 2018, vol. 47, pp. 4860-4908.

(Continued)

*Primary Examiner* — William D Young
(74) *Attorney, Agent, or Firm* — Michael Best & Friedrich LLP

(57) ABSTRACT

Provided are an ink composition, comprising greater than 0.2% by weight a graphene quantum dot nanosurfactant, a printable material, and a solvent, wherein the printable material is dispersed in the solvent by the graphene quantum dot nanosurfactant, and a method of preparing an ink composition. Advantageously, the present ink composition may be printed onto 2D and 3D substrates to form printed films with improved mechanical stability and photoconductance.

11 Claims, 31 Drawing Sheets

(56) References Cited

OTHER PUBLICATIONS

CAS Reg No. 7782-42-5, grade 3805, "Graphite", <https://www.chemicalbook.com/ChemicalProductProperty_EN_CB9369364.htm>, website available at least as early as Apr. 2010, 5 pages.

Chang et al., "A highly sensitive ultraviolet sensor based on facile in situ solution-grown ZnO nanorod/graphene heterostructure", Nanoscale, 2011, vol. 3, pp. 258-264.

Coleman, "Liquid-Phase Exfoliation of Nanotubes and Graphene", Adv. Funct. Mater., 2009, vol. 19, pp. 3680-3695.

Fantuzzi et al., "Color Sensitive Response of Graphene/Graphene Quantum Dot Phototransistors", J. Phys. Chem. C, 2019, vol. 123, pp. 26490-26497.

George et al., "Ultrafast Optical-Pump Terahertz-Probe Spectroscopy of the Carrier Relaxation and Recombination Dynamics in Epitaxil Graphene", Nano Letters, 2008, vol. 8, No. 12, pp. 4248-4251.

Gupta et al., "Water Dispersible, Positively and Negatively Charged MoS2 Nanosheets: Surface Chemistry and the Role of Surfactant Binding", J. Phys. Chem. Lett., 2015, vol. 6, pp. 739-744.

He et al., "Hindrance function for sedimentation and creaming of colloidal disks", Phys. Rev. E, 2010, vol. 81, 026310-1, 7 pages.

Hyun et al., "Scalable, Self-Aligned Printing of Flexible Graphene Micro-Supercapacitors", Adv. Energy Mater., 2017, vol. 7, 1700285, pp. 1-8.

Katerinopoulou et al., "Large-Area All-Printed Temperature Sensing Surfaces Using Novel Composite Thermistor Materials", Adv. Electro. Mater., 2019, vol. 5, 1800605, pp. 1-7.

Kelly et al., "All-printed thin-film transistors from networks of liquid-exfoliated nanosheets", Science, 2017, vol. 356, pp. 69-73.

Ko et al., "Thickness dependence on the optoelectronic properties of multilayered GaSe based photodetector", Nanotechnology 2016, vol. 27, 325202, 6 pages.

Konstantatos et al., "Hybrid graphene-quantum dot phototransistors with ultrahigh gain", Nat. Nanotechnol., 2012, vol. 7, pp. 363-368.

Li et al., "Efficient Inkjet Printing of Graphene", Adv. Mater., 2013, vol. 25, pp. 3985-3992.

Lin et al., "Dispersion and assembly of reduced graphene oxide in chiral nematic liquid crystals by charged two-dimensional nanosurfactants", Chem. Eng. Journal, 2018, vol. 334, pp. 1023-1033.

Lin et al., "Solution-processable 2D semiconductors for high-performance large-area electronics", Nature, 2018, vol. 562, pp. 254-269.

Lu et al., "Flexible, Print-in-Place 1D-2D Thin-Film Transistors Using Aerosol Jet Printing", ACS Nano, 2019, vol. 13, pp. 11263-11272.

Luo et al., "Electrostatic-Driven Dynamic Jamming of 2D Nanoparticles at Interfaces for Controlled Molecular Diffusion", Angew. Chem. Int. Ed., 2018, vol. 57, pp. 11752-11757.

Luo et al., "Nanofluid of graphene-based amphiphilic Janus nanosheets for tertiary or enhanced oil recovery: High performance at low concentration", PNAS, 2016, vol. 113, No. 28, pp. 7711-7716.

Mansour et al., "Facile Doping and Work-Function Modification of Few-Layer Graphene Using Molecular Oxidants and Reductants", Adv. Funct. Mater., 2017, vol. 27, 1602004, 13 pages.

McManus et al., "Water-based and biocompatible 2D crystal inks for all-inkjet-printed heterostructures", Nat. Nanotechnol., 2017, vol. 12, pp. 343-351.

Parviz et al., "Dispersions of Non-Covalently Functionalized Graphene with Minimal Stabilizer", ACS Nano, 2012, vol. 6, pp. 8857-8867.

Raj et al., "Ultralow concentration of molybdenum disulfide nanosheets for enhanced oil recovery", Fuel, 2019, vol. 251, pp. 514-522.

Saeidi-Javash et al., "3D Conformal Printing and Photonic Sintering o High-Performance Flexible Thermoelectric Films Using 2D Nanoplates", Adv. Funct. Mater., 2019, vol. 29, pp. 1-6.

Saleh et al., "Three-dimensional microarchitected materials and devices using nanoparticle assembly by pointwise spatial printing", Sci. Adv., 2017, vol. 3, e1601986, 8 pages.

Schlierf et al., "Nanoscale insight into the exfoliation mechanism of graphene with organic dyes: effect of charge, dipole and molecular structure", Nanoscale, 2013, vol. 5, pp. 4205-4216.

Secor et al., "Gravure Printing of Graphene for Large-Area Flexible Electronics", Adv. Mater., 2014, vol. 26, pp. 4533-4538.

Secor et al., "Rapid and Versatile Photonic Annealing of Graphene Inks for Flexible Printed Electronics", Adv. Mater., 2015, vol. 27, pp. 6683-6688.

Secor et al., "Inkjet Printing of High Conductivity, Flexible Graphene Patterns", J. Phys. Chem. Lett. 2013, vol. 4, pp. 1347-1351.

Shinde et al., "Growth of Colloidal Nanoplate Liquid Crystals Using Temperature Gradients", ACS Nano, 2019, vol. 13, pp. 12461-12469.

Smith et al., "Large-Scale Exfoliation of Inorganic Layered Compounds in Aqueous Surfactant Solutions", Adv. Mater., 2011, vol. 23, pp. 3944-3948.

Son et al., "Emissive ZnO-graphene quantum dots for white-light-emitting diodes", Nat. Nanotechnol., 2012, vol. 7, pp.465-471.

Sun et al., "Infrared Photodetectors Based on CVD-Grown Graphene and PbS Quantum Dots with Ultrahigh Responsivity", Adv. Mater., 2012, vol. 24, pp. 5878-5883.

Varghese et al., "High-performance and flexible thermoelectric films by screen printing solution-processed nanoplate crystals", Sci. Reports, 2016, vol. 6, pp. 1-6.

Wang et al., "Thermosensitive ZrP-PNIPAM Pickering Emulsifier and the Controlled-Release Behavior", ACS Appl. Mater. Interfaces, 2017, vol. 9, pp. 7852-7858.

Wu et al., "Raman spectroscopy of graphene-based materials and its applications in related devices", Chem. Soc. Rev., 2018, vol. 47, pp. 1822-1873.

Yang et al., "Dielectric nanosheets made by liquid-phase exfoliaton in water and their use in graphene-based electronics", 2D Mater. 2014, vol. 1, 011012, 11 pages.

Yang et al., "Systems of mechanized and reactive droplets powered by multi-responsive surfactants", Nature, 2018, vol. 553, pp. 313-319.

Zeng et al., "Aqueous Exfoliation of Graphite into Graphene Assisted by Sulfonyl Graphene Quantum Dots for Photonic Crystal Applications", ACS Appl. Mater. Interfaces 2017, vol. 9, pp. 30797-30804.

Zeng et al., "Colloidal nanoparticle inks for printing functional devices: emerging trends and future prospects", J. Mater. Chem. A, 2019, vol. 7, 36 pages.

Zeng et al., "Iridescence in nematics: Photonic liquid crystals of nanoplates in absence of long-range periodicty", PNAS, 2019, vol. 116, No. 13, pp. 18322-18327.

Zhang et al., "High-performance photodetectors for visible and near-infrared lights based on individual WS2 nanotubes", Appl. Phys. Lett., 2012, vol. 100, pp. 243101-1-24310-5.

Zhang et al., "Natural Halloysites-Based Janus Platelet Surfactants for the Formation of Pickering Emulsion and Enhanced Oil Recovery", Sci. Rep., 2019, vol. 9, No. 163, 9 pages.

* cited by examiner

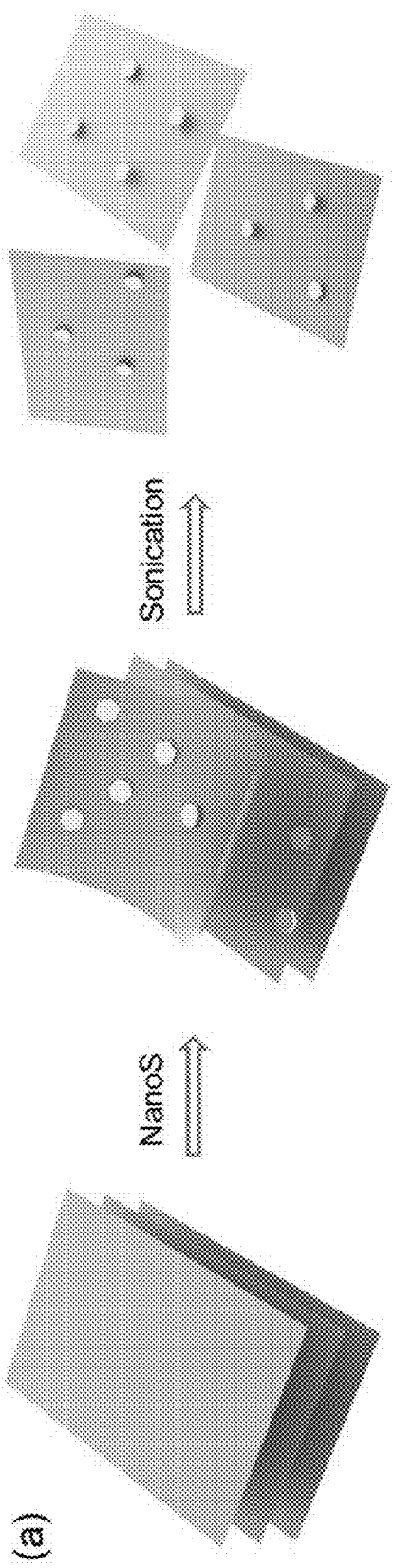
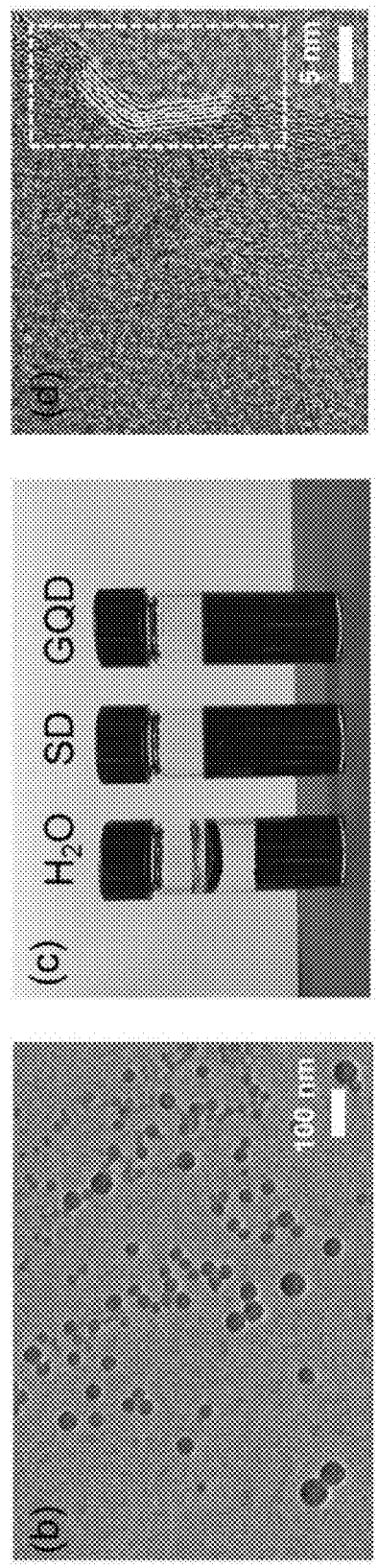
FIG. 1A  FIG. 1B  FIG. 1C  FIG. 1D

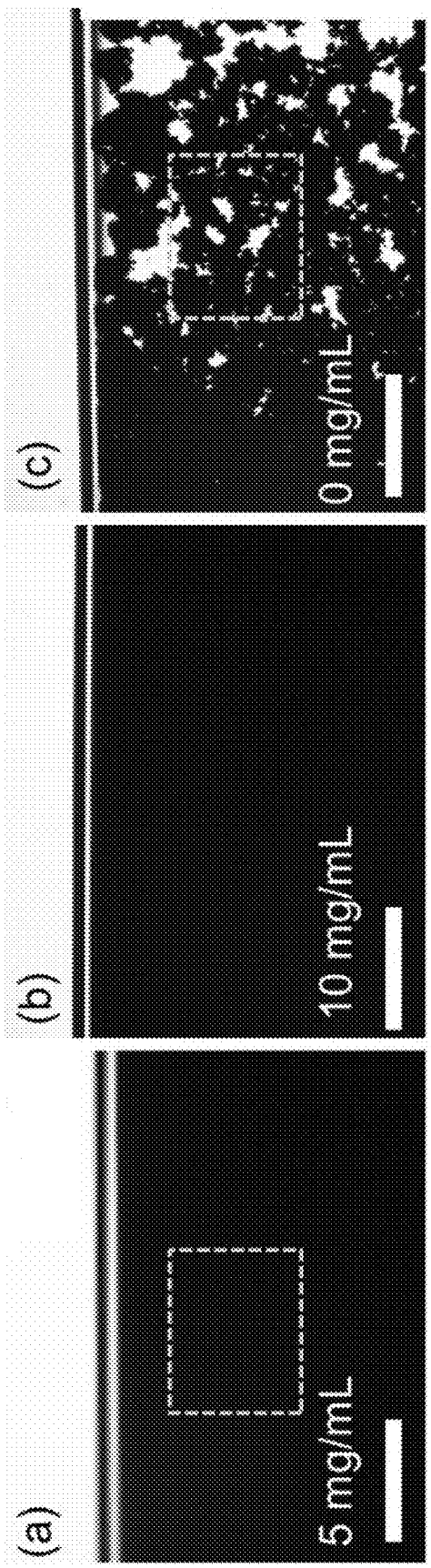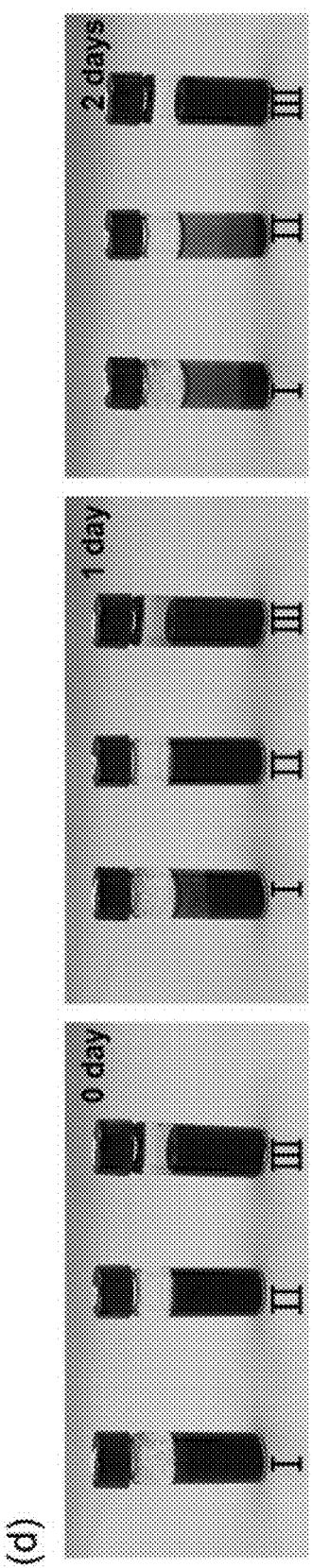
FIG. 5A  FIG. 5B  FIG. 5C  FIG. 5D

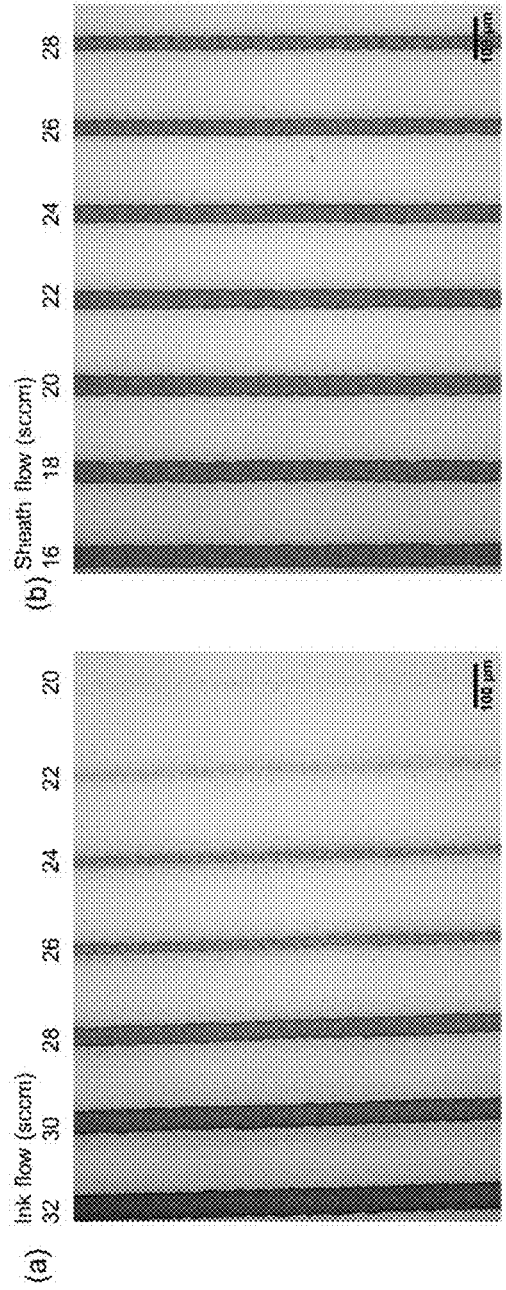
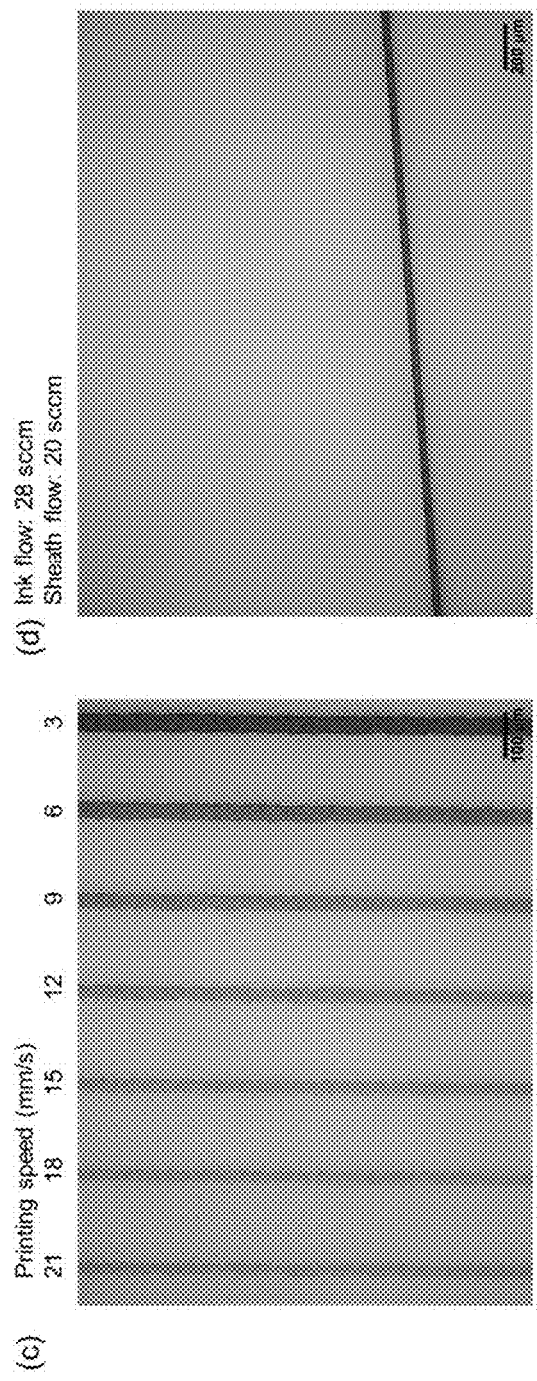
FIG. 9A
FIG. 9B
FIG. 9C
FIG. 9D

NANOSURFACTANT FORMULATIONS AND USE THEREFOR

CROSS-REFERENCE TO RELATED APPLICATIONS

This application claims the benefit of and priority to U.S. Provisional Application No. 63/043,963, filed on Jun. 25, 2020, the entire content of which is hereby incorporated by reference.

STATEMENT OF GOVERNMENT INTEREST

This invention was made with government support under Grant number CMMI1747685 awarded by the National Science Foundation (NSF), and Grant numbers DE-NE0008712 and DE-NE0008701 awarded by U.S. Department of Energy. The government has certain rights in the invention.

INTRODUCTION

Solution-based processing of nanomaterials has been studied recently as an emerging technique to complement the semiconductor industry owing to its rapid customization and the ability to fabricate wearable/flexible devices. Compared with solution-processing methods (e.g., spin coating), non-contact printing strategies (e.g., inkjet printing and aerosol jet printing) provide technological avenues to directly convert nanoparticles into final device patterns on both two-dimensional (2D) and three-dimensional (3D) substrates with superior spatial resolution (line width of approximately 10 μm), which is essential for fabricating microscale devices with sophisticated architectures. In the past decade, organic solvents including ethanol, cyclohexanone, terpineol, and ethylene glycol have been extensively investigated for the printing of 2D nanomaterials; however, limitations of organic solvents still exist due to their inherent toxicity, flammability, and poor biocompatibility. To manufacture functional devices in a scalable, sustainable, and affordable manner, conventional ink formulations that involve toxic/expensive organic solvents should be avoided.

Further, to formulate printable 2D nanomaterial inks in water, organic surfactants (either polymers or small molecule amphiphiles) are often used to suppress particle aggregation. These organic molecules can reduce the surface tension of water as well as the interfacial energy of particles and water, improving the colloidal stability of nanoparticle inks. Several surfactants have been reported to stabilize 2D nanosheets, while discotic amphiphiles with a quasi-flat molecular structure (e.g. sodium cholate (SC)) are particularly effective for dispersing 2D nanomaterials. Due to effective adsorptions on the surface of 2D flakes, sodium cholate has demonstrated good surfactant properties in stabilizing aqueous dispersions of $WS_2$, $MoSe_2$, $MoTe_2$, and h-BN nanosheets. Despite significant advances in surfactant-based ink formulation, several challenges still exist. For example, conventional surfactants have limited or no contribution to the mechanical bonding of printed nanomaterials, and thus additional polymer binders are required to print robust devices. Even worse, the residual of organic surfactants in printed devices often compromises the overall functionalities of nanomaterials (e.g., deteriorating interfacial transport properties), which requires severe post-treatments such as high-temperature thermal annealing or expensive laser sintering.

Thus, there remains a need for a new generation of water-based nanoparticle inks. In addition, the development of new surfactants that does not compromise, or that even improves, the performance of printed devices is essential for the printing of next-generation high-performance devices.

SUMMARY

In one aspect, the present disclosure provides ink composition, comprising
greater than 0.2% by weight a graphene quantum dot nanosurfactant;
a printable material; and
a solvent,
wherein the printable material is dispersed in the solvent by the graphene quantum dot nanosurfactant.

In another aspect, the present disclosure provides a method of preparing an ink composition, comprising
(a) dissolving a graphene quantum dot nanosurfactant in a solvent to form a solution; and
(b) mixing a printable material with the solution, whereby at least a portion of the printable material is dispersed in the solvent by the graphene quantum dot nanosurfactant,
wherein the graphene quantum dot nanosurfactant is an amount of greater than 0.2% by weight of the ink composition.

In yet another aspect, the present disclosure provides a method of printing, comprising applying the ink composition as disclosed herein onto a substrate thereby forming a printed film.

BRIEF DESCRIPTION OF THE DRAWINGS

FIGS. 1A-1D show representative results of a synthesis of graphene inks as described herein. FIG. 1A shows a schematic illustration of liquid exfoliation of graphite into graphene using NanoS. FIG. 1B shows TEM image of NanoS. (c) Photographic image of various ink dispersions showing colloidal stability comparison between aqueous graphite suspension (left), SC-stabilized graphene dispersion (middle), and NanoS-stabilized graphene dispersion (right). FIG. 1D shows TEM image of a graphene flake showing a thickness of 5-7 layers.

FIG. 2A shows photographic images of pendant droplets of nanosurfactant solution (left) and pure water (right) in dodecane. FIG. 2B shows interfacial tension of water decreased as a function of nanosurfactant concentration. FIGS. 2C-2E show SEM images of polymerized styrene emulsions using NanoS at 0.1 wt % (FIG. 2C), 0.5 wt % (FIG. 2D), and 1.0 wt % (FIG. 2E), demonstrating the ability of NanoS to emulsify polymerizable oil in emulsion polymerization. Scale bars in FIGS. 2C-2E are of 500 nm.

FIGS. 5A-5C show the optical microscopic images of graphene inks with different NanoS concentrations: 5 mg/mL (FIG. 5A), 10 mg/mL (FIG. 5B), and 0 mg/mL (FIG. 5C). Scale bars in FIGS. 5A-5C are 200 μm. FIG. 5D shows the camera image of graphene in pure water (I), pure ethanol (II), and water with 5 mg/mL NanoS (III), highlighting the colloidal stability of NanoS-Gr ink.

FIG. 8A shows schematic illustration of printing graphene ink using QD-based nanosurfactant as the dispersant. FIG. 8B shows TEM image of NanoS-stabilized graphene nanosheets (scale bar is of 500 nm). FIG. 8C shows camera images of various 2D-crystal inks with and without nanosurfactant. The nanoparticle inks from left to right are graphene, carbon nanotubes, $WS_2$, $MoS_2$, and h-BN. FIG. 8D shows reduced interfacial tension of water/dodecane system by introducing NanoS. FIG. 8E shows a printed patterns of "Graphene," "$MoS_2$ NP," and "Carbon NT" using water-based graphene, $MoS_2$, and carbon nanotube ink, respectively, on paper (scale bar is of 2 mm). FIG. 8F shows a photographic demonstration of 3D conformal printing process using an aerosol jet printer (scale bar is of 5 mm).

FIGS. 9A-9D show the printing behavior of NanoS-stabilized graphene inks. FIG. 9A shows the printed lines with decreasing gas flow of graphene ink from 32 to 20 sccm. FIG. 9B shows the printed lines with increasing sheath gas flow from 16 sccm to 28 sccm. FIG. 9C shows the printed lines with decreasing printing speed from 21 to 3 mm/s. FIG. 9D shows a typical printed line with one printing pass under ink flow of 28 sccm and sheath flow of 20 sccm.

FIG. 15A shows optical microscopy images showing consistent printing of NanoS-Gr films on different substrates (scale bar is 1 mm). FIG. 15B shows the film thicknesses of the NanoS-stabilized graphene inks printed on $Si/SiO_2$ before and after annealing. FIG. 15C shows optical image of a printed pattern with water-based graphene ink on paper, demonstrating fine line resolution. FIG. 15D shows relative resistance ($R/R_0$) measured as a function of bending cycles for graphene films printed on polyimide substrates (bending radius of 12 mm). The inset image shows a printed serpentine pattern (scale bar: 1 cm), indicating the potential of fabricating flexible/stretchable devices. FIG. 15E shows resistance of graphene films versus number of tape pulling. Inset shows a graphene film under taping test with a 10 mm scale bar. FIG. 15F shows durability test of printed graphene films by measuring the film thickness change during 100 scratch cycles. The inset shows a NanoS-Gr film under scratching test with a tip radius of 2 μm and a scratch force of 10 mN (scale bar in the inset is 5 mm).

FIG. 17A shows fluorescence optical microscopy image of printed QD-based nanosurfactant, showing strong photoluminescent property (scale bar is of 200 μm). FIG. 17B shows the Raman spectra of NanoS-Gr and graphite. FIG. 17C shows the photocurrent of NanoS-Gr over different excitation wavelength of light. FIG. 17D shows photocurrent of NanoS-Gr and SC-Gr under different light powers ($V_b$=2 V). Compared with SC-Gr, the NanoS-Gr showed a significantly higher photocurrent upon UV illumination. FIG. 17E shows the photocurrent of NanoS-Gr under different printing passes. FIG. 17F shows current generated by switching the laser source on and off with different laser power ($V_b$=2 V).

FIGS. 19A-19C show schematic illustrations of in-plane device of Ag/NanoS-Gr/Ag (FIG. 19A) and NanoS-Gr/GaN/NanoS-Gr (FIG. 19B), and of a cross-plane device of Ag/NanoS-Gr/Al (FIG. 19C). FIGS. 19D-19F show the I-V curves corresponding to the three photodetectors under UV illumination (shown in FIGS. 19A-19C), respectively. The insets of FIGS. 19D-19F are camera images of the printed devices with scale bars of 5, 5, and 3 mm, respectively. FIG. 19G shows photographic image of all-printed 3D photodetector array. FIG. 19H shows the photocurrent mapping under upright illumination. FIG. 19I shows photographic image of all-printed 3D photodetector array. FIG. 19J shows the photocurrent mapping under tilted-angle illumination. The radius of hemisphere is 15 mm.

FIGS. 20A-20C shows normalized photocurrent density of different devices including in-plane devices of Ag/NanoS-Gr/Ag (FIG. 20A), NanoS-Gr/GaN/NanoS-Gr (FIG. 20B), and cross-plane devices of Ag/NanoS-Gr/Al (FIG. 20C). FIG. 20D shows printed sensor array on 3D polydimethylsiloxane (PDMS) substrate, indicating the capability of printing devices on rough surface. The inset shows a typical microscopic image of PDMS substrate with a scale bar of 100 μm.

DETAILED DESCRIPTION

Figure 2A:
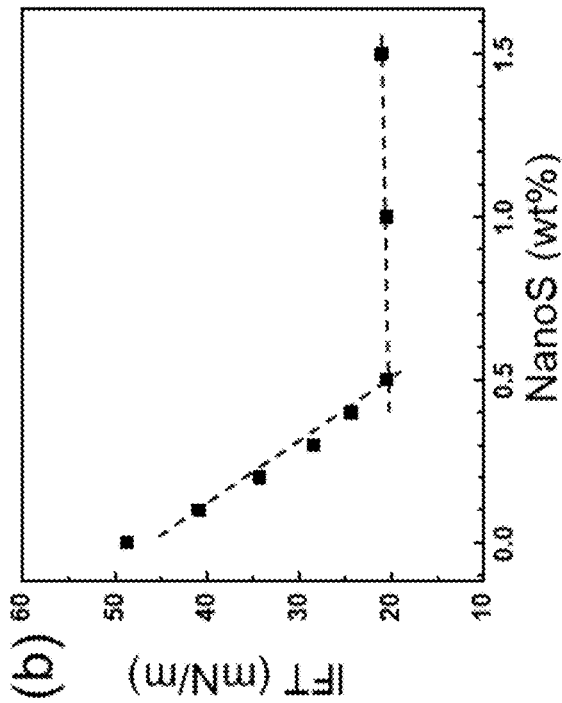
FIGS. 2A-2E show the interfacial properties of nanosurfactant.

The present disclosure relates to highly versatile water-based ink formulations with surface-active nanosurfactants of graphene quantum dot (GQD) for printing a range of 2D materials. A colloidal graphene quantum dot nanosurfactant may be used to stabilize various types of 2D materials in aqueous inks. In particular, a graphene ink with superior colloidal stability is demonstrated by GQD nanosurfactants via the π-π stacking interaction, leading to the printing of multiple high-resolution patterns on various substrates using a single printing pass. Remarkably, the present nanosurfactants may significantly improve the mechanical stability of the printed graphene films compared with those of conventional molecular surfactant, as evidenced by 100 taping, 100 scratching, and 1000 bending cycles. Additionally, the printed composite film exhibits improved photoconductance using UV light with 400 nm wavelength, arising from excitation across the nanosurfactant bandgap. Taking advantage of the 3D conformal aerosol jet printing technique, UV sensors of heterogeneous structures may be directly printed on 2D flat and 3D spherical substrates, demonstrating the capacity of manufacturing geometrically versatile devices based on nanosurfactant inks.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

The terms "graphene" and "graphite" as used herein refer to the two-dimensional and three-dimensional carbon materials, respectively, as understood in the art.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated

2. Ink Composition

In one aspect, the present disclosure provides an ink composition, comprising:
greater than 0.2% by weight a graphene quantum dot nanosurfactant;
a printable material; and
a solvent,
wherein the printable material is dispersed in the solvent by the graphene quantum dot nanosurfactant.

Nanoparticle-based surfactants or so-called nanosurfactants (NanoSs) were reported as a new category of surfactants due to the unique synergetic behavior of nanoparticles and surfactants. In these surfactants, nanoparticles may be engineered with functional groups on the surface via either electrostatic forces or covalent bonding, which render their ability of reducing the interfacial tension as well as stabilizing various colloidal systems. Recently, studies on Pickering emulsions have shown that graphene, $MoS_2$, aluminosilicate clays, and some quantum dots (QDs) are able to lower interfacial tension and show "surfactancy" upon appropriate design of their surface properties. These nanoparticle-based surfactants retain their nanoparticle properties (e.g., electronic bandgap), which may be beneficial in overall device performance, eliminating the need of surfactant removal for final device fabrication. For example, graphene showed weak photoconductance because of the ultrafast recombination of photocarriers, which makes it challenging to be directly used in optical detectors; yet the viability of graphene in such applications may be improved using nanosurfactants with suitable bandgap. The use of nanosurfactant in ink formulations may circumvent the inherent limitation of molecular surfactants; however, nanosurfactants have rarely been explored in additive manufacturing and their printing behavior in device fabrication remains largely unknown.

The graphene quantum dot nanosurfactant may a polycyclic aromatic hydrocarbon (PAH) core. The core may have 30-200 carbon atoms. The graphene quantum dot nanosurfactant may further have one or more hydrophilic groups attached to the core, such as sulfonyl group (e.g., —$SO_3H$, —$SO_3^-$), carboxyl group (e.g., —COOH, —$COO^-$), amine group (e.g., —$NH_2$, —$NH_3^+$). In some embodiments, the graphene quantum dot nanosurfactant has one or more sulfonyl groups attached to the core. The hydrophilic groups may be attached to the core by forming covalent bonds in a reaction. For example, the core may be modified by reacting with a C=C double bond of an agent having the hydrophilic group in a polymerization reaction, thereby attaching the hydrophilic group to the core. In some embodiments, the agent is molecule having a C=C double bond and a sulfonyl group. In some embodiments, the graphene quantum dot nanosurfactant has a molecular weight of at least 2000 Da.

The graphene quantum dot nanosurfactant may be produced by reacting citric acid and 4-styrenesulfonic acid sodium salt. In some embodiments, the graphene quantum dot nanosurfactant is produced by condensation and pyrolysis of citric acid and 4-styrenesulfonic acid sodium salt. For example, the graphene quantum dot nanosurfactant may be produced by the process disclosed in Zeng et al. (ACS Appl. Mater. Interfaces, 2017, 9, 30797), which is incorporated herein by reference in its entirety. Specifically, a polymer-like aromatic intermediate may be first formed by condensation of citric acid at about 200° C. in the presence of air, which may then be linked with C=C double bonds of 4-styrenesulfonic acid sodium salts via a thermal polymerization reaction. To remove excess starting materials and potential polymeric byproducts, the crude products may be purified by dialysis (2000 Da).

The graphene quantum dot nanosurfactant may have a diameter of about 10 nm to about 100 nm, including about 10 nm to about 80 nm, about 10 nm to about 70, about 15 to about 65, or about 15 nm to about 55 nm. The graphene quantum dot nanosurfactant may have a diameter of about 15 nm to about 55 nm. The graphene quantum dot nanosurfactant may have an average diameter of about 20 nm to about 45 nm, including about 20 nm to about 40 nm, about 20 nm to about 35 nm, or about 25 nm to about 35 nm. The graphene quantum dot nanosurfactant may have an average diameter of about 20 nm, about 25 nm, about 30 nm, or about 35 nm. In some embodiments, the graphene quantum dot nanosurfactant may have an average diameter of about 25 nm to about 35 nm.

The graphene quantum dot nanosurfactant may have a carbon:oxygen:sulfur atomic ratio of about (20-50):(5-20):1. The atomic ratio may be, for example, about 40:20:1, about 30:15:1, or about 25:10:1. In some embodiments, the graphene quantum dot nanosurfactant may have a carbon:oxygen:sulfur atomic ratio of about 25:10:1.

The present ink composition may comprise at least 0.25% by weight the graphene quantum dot nanosurfactant. The ink composition may comprise at least 0.50%, at least 0.75%, at least 1.00%, at least 1.25%, at least 1.50%, at least 1.75%, at least 2.00%, at least 2.50%, at least 3.00%, at least 3.50%, at least 4.00%, or at least 4.50% by weight the graphene quantum dot nanosurfactant. The ink composition may comprise at most 5.00%, at most 4.50%, at most 4.00%, at most 3.50%, at most 3.0%, at most 2.50%, at most 2.00%, at most 1.75%, at most 1.50%, at most 1.25%, at most 1.00%, at most 0.75%, or at most 0.50% by weight the graphene quantum dot nanosurfactant. The ink composition may comprise from about 0.25% to about 5.0%, about 0.5% to about 4.0%, about 0.5% to about 3.0%, or about 0.5% to about 2.0% by weight the graphene quantum dot nanosurfactant. In some embodiments, the ink composition comprises about 0.5% to about 2.0% by weight the graphene quantum dot nanosurfactant.

The printable material includes any material that may be exfoliated by the graphene quantum dot nanosurfactant as disclosed herein. Suitable printable materials for the present ink composition include, but are not limited to, graphene, transition metal dichalcogenide (TMD), hexagonal boron nitride (h-BN), carbon nanotubes (CNT), or a combination thereof as a printable material. Transition metal dichalcogenides may have a formula of $MX_2$, in which M is a transition metal atom (e.g., Mo, W, etc.) and X is a chalcogen atom (e.g., S, Se, or Te). Suitable transition metal dichalcogenides include, but are not limited to $MoS_2$, $MoSe_2$, $MoTe_2$, $WS_2$, and $WSe_2$. In some embodiments, the printable material comprises graphene, $MoS_2$, $MoSe_2$, $MoTe_2$, $WS_2$, hexagonal boron nitride (h-BN), carbon nanotubes (CNT), or a combination thereof. In some embodiments, the printable material comprises graphene.

The present ink composition may comprise at least 0.05% by weight the printable material. The ink composition may comprise at least 0.1%, at least 0.2%, at least 0.5%, at least 1.0%, at least 1.5%, or at least 2.0% by weight the printable material. The ink composition may comprise at most 2.5%, at most 2.0%, at most 1.5%, at most 1.0%, or at most 0.5% by weight the printable material. The ink composition may comprise from about 0.1 to about 2.0%, about 0.5% to about 2.0%, or about 1.0% to about 2.0% by weight the printable material. In some embodiments, the ink composition comprises about 0.5% to about 2.0% by weight the printable material.

The graphene quantum dot nanosurfactant may facilitate the dispersion of the printer material in a solvent and improve the colloidal properties of the present ink composition. In some embodiment, the weight ratio of the printable material to the graphene quantum dot nanosurfactant in the ink composition may be about 0.1:1 to about 10:1, including about 0.1:1 to about 5:1, about 0.1:1 to about 2:1, about 0.1:1 to about 1:1, about 1:1 to about 10:1, about 2:1 to about 10:1, or about 5:1 to about 10:1. For example, the weight ratio of the printable material to the graphene quantum dot nanosurfactant may be about 0.1:1, about 0.5:1, about 1:1, about 5:1, or about 10:1.

The solvent may be an aqueous solvent or an organic solvent. Suitable solvents include, for example, water, ethanol, isopropanol, cyclohexanone, terpineol, ethylene glycol, or a combination thereof. In some embodiments, the solvent comprises water.

The improved colloidal properties of the present ink composition may be demonstrated, for example, by Zeta potential and other measurements known in the art. The present ink composition may have a Zeta potential of about −30 mV to about −80 mV, including for example about −30 mV to about −75 mV, about −30 mV to about −65 mV, about −40 mV to about −65 mV, about −50 mV to about −65 mV. In some embodiments, the ink composition may have a Zeta potential of about −50 mV to about −65 mV.

3. Methods

In another aspect, provided is a method of preparing an ink composition, comprising
- (a) dissolving a graphene quantum dot nanosurfactant in a solvent to form a solution; and
- (b) mixing a printable material with the solution, whereby at least a portion of the printable material is dispersed in the solvent by the graphene quantum dot nanosurfactant,
- wherein the graphene quantum dot nanosurfactant is in an amount of greater than 0.2% by weight of the ink composition.

The graphene quantum dot nanosurfactant, the printable material, and the solvent are as described above for the present ink composition. The graphene quantum dot nanosurfactant may be used in an amount of about 0.25% to about 5.0% by weight of the resulting ink composition. In some embodiments, the graphene quantum dot nanosurfactant is used in an amount of about 0.5% to about 4.0%, about 0.5% to about 3.0%, or about 0.5% to about 2.0% by weight of the ink composition. In some embodiments, the graphene quantum dot nanosurfactant is in an amount of about 0.5% to about 2.0% by weight of the ink composition.

The printable material for the present method may comprise graphene, transition metal dichalcogenide (TMD) such as $MoS_2$ or $WS_2$, hexagonal boron nitride (h-BN), carbon nanotubes (CNT), or a combination thereof. In some embodiments, the printable material comprises graphene. In some embodiments, the solvent comprises water.

Sonication may be used to facilitate the dispersion of the printable material in the solvent. In some embodiments, the mixing of (b) includes sonicating the solution after adding the printable material to the solution of the graphene quantum dot nanosurfactant in a solvent. Known sonication techniques and instruments, such as tip-sonication, may be used.

The preparation method may further comprises removing any remaining printable material that is not dispersed in the solvent. For example, a centrifugation step may be included to precipitate the remaining solid printable material, and the liquid phase containing the dispersed printable material may be isolated.

Printing techniques using nanomaterials have emerged as a versatile tool for fast prototyping and potentially large-scale manufacturing of functional devices. Surfactants play a significant role in many printing processes due to their ability to reduce interfacial tension between ink solvents and nanoparticles and thus improve ink colloidal stability. The present disclosure provides an ink composition with graphene quantum dot nanosurfactants, which may stabilize a range of nanomaterials for printing applications materials. Remarkably, the present disclosure may provide ink compositions with superior colloidal stability, which enables the printing of high-resolution patterns on various substrates.

In another aspect, provided is a method for printing, comprising applying the ink composition as described herein onto a substrate thereby forming a printed film.

The ink composition may be applied by any suitable ink-based printing process and any suitable printer. In some embodiments, the ink composition is applied by an aerosol jet printer or an ink-jet printer.

Suitable substrates include, but are not limited to, glass, metal, paper, semiconductor, silica, polymer (such as polyimides), or a combination thereof. In some embodiments, the substrate comprises glass, a metal, or a semiconductor. In come embodiments, the substrate comprises a metal, such as silver (Ag) or aluminum (Al). In come embodiments, the substrate comprises a semiconductor, such as gallium nitride (GaN). The substrate may be a 2-dimensional substrate or a 3-dimensional substrate. Suitable printing parameters for 2-dimensional or 3-dimensional substrates may be employed according to techniques known in the art.

The printed film may have a thickness as determined by the number of layers formed by each print pass. For example, each layer may have a thickness of about 500 nm to about 2000 nm, such as about 800 nm, about 1000 nm, about 1200 nm, about 1500 nm, or about 1800 nm. The thickness of the printed film may be the total thickness of all single printed layers.

The printed film may be subject to a thermal annealing step. Conventional methods involving molecular surfactant showed 50-80% thickness reduction of the printed graphene film thickness during annealing processes due to the decomposition of organic stabilizers and densification of the graphene network. Advantageously, the present graphene quantum dot nanosurfactant may remain bonded with the printed material (e.g., graphene flakes) after thermal annealing (e.g., about 200° C.), and as a result the thickness of the printed film of the present method may not change significantly during the annealing process. The annealing temperature may be at about 200° C., about 250° C., about 300° C., about 350° C., about 400° C., or about 450° C. In some embodiments, the thickness of the printed film is reduced by at most 30%, at most 25%, at most 20%, at most 15%, or at most 10% after annealing. For example, the printed film may have a thickness of about 1200 nm before annealing, and the thickness is reduced to about 900 nm after annealing (an about 25% reduction of the thickness).

A wide range of functional devices, including sensors, thermoelectrics, and energy storage devices, have been developed by printing colloidal nanomaterials. Recently, two-dimensional nanomaterials have garnered research interests owing to their promising electronic/optical properties. For example, flexible thin-film transistors printed with 2D nanomaterials inks including graphene (Gr), transition metal dichalcogenide (TMD), and hexagonal boron nitride (h-BN) have been demonstrated.

In yet another aspect, provided is a device comprising a printed film formed by the method of printing as disclosed herein. The device may be a transistor, a photodetector, an energy storage device, or a thermoelectric device. In some embodiments, the device is a photodetector, such as a 3D photodetector array. In particular embodiments, the device is a photodetector having a printed film formed by an ink composition as disclosed herein comprising graphene as the printable material.

EXAMPLES

Materials and Methods.

Citric acid monohydrate (99.5%) and 4-styrenesulfonic acid sodium salt (97%) were purchased from Sigma-Aldrich, USA. Expanded graphite was obtained from Asbury Carbons (CAS no. 7782-42-5, grade 3805). All chemicals and solvents were used as received without further purification unless otherwise stated. The colloidal stability of nanomaterial inks was evaluated by zeta potential measurements (Nano-ZS, Malvern, USA). A transmission electron microscope (JEOL 2011, Japan) was used to image the 2D flakes as well as the nanosurfactants. A focused ion beam-scanning electron microscope (FIB/SEM, Helios G4 UX) was used to obtain SEM images of samples. Fluorescent microscopic images were taken using a Nikon Eclipse 90i Widefield Fluorescent Microscope. The flexibility of the film was studied using repeated bending testing with bending radius of 12 mm ($\approx$90°). Adhesive tapes (3M Scotch Double Sided Removable Tape, USA) were used to evaluate the mechanical robustness of printed graphene films with a metal object of 50 g, which was used to apply a constant pressure ($\approx$20 KPa) on tapes for ensuring the good contact between adhesive tape and graphene film. The scratching experiments were performed using a stylus profilometer (Bruker Corporation, USA) with a tip radius of 2 µm and a stylus force of 10 mN ($\approx$795.8 MPa).

Synthesis of NanoS.

Graphene quantum dot nanosurfactant was prepared according to the process reported by Zeng et al. (ACS Appl. Mater. Interfaces, 2017, 9, 30797), which is incorporated herein by reference in its entirety. First, 1.4 g of citric acid and 0.6 g of 4-styrenesulfonic acid sodium salt were fully homogenized by a vortex machine. Then, the solid mixture was loaded into a 20 mL glass vial followed by calcination in air at 200° C. for 80 min. After the system cooled down to room temperature, 5 mL deionized water was used to fully dissolve dark solid residue, followed by a dialysis treatment (2000 Da) to remove possible unreacted starting materials or byproducts. The final product was dried under vacuum before diluted into desired concentration for the exfoliation experiments Preparation of Graphene, CNT, and Other 2D Crystal Inks.

For the synthesis of 1D/2D crystal ink, functionalized graphene quantum dots were used as nanosurfactants. Taking graphene ink for example, 1 g of nanosurfactant was dissolved in 50 mL of DI water to obtain a 20 mg/mL nanosurfactant solution. Then, 2 g of graphite (Asbury Carbons, grade 3805) was added into the above solution and was tip-sonicated for 1 h. Next, the as-prepared sonicated product was centrifuged at 2000 rpm for 30 min to remove unexfoliated bulk crystals. This stable dispersion was used for further characterizations. For graphene ink stabilized by small molecule surfactant, sodium cholate was used to replace nanosurfactant while other experimental details remain the same.

3D Aerosol Jet Printing.

A high-resolution aerosol jet printer (OPTOMEC AJP 300) was employed to print nanomaterial inks with a printing speed from 3 to 21 mm $5^{-1}$. Computer-aided design software (AutoCAD) was used to generate printable patterns for the device fabrication.

Example 1 Ink Formulation and Characterization

Two-dimensional (2D) crystal inks were prepared by liquid-phase exfoliation of graphite into graphene (Gr) in water using graphene quantum dots nanosurfactants (NanoS) as dispersants. NanoS-assisted exfoliation allows producing a mixture of single- to few-layered graphene sheets (mostly layers<10). Tip sonication was used to achieve lab-scale liquid exfoliation (FIG. 1A). Under the sonication, multilayered graphite was exfoliated into few-layered graphene sheets which were simultaneously stabilized by NanoS that provided electrostatic stabilization for graphene dispersed in water. Such stabilizing behavior of NanoS is similar to some molecular surfactants, e.g., sodium cholate (SC). However, the NanoS is essentially a type of nanoparticle with average size of 31±12 nm, as shown in transmission electron microscopy (TEM) image (FIG. 1B). In this study, SC was used as dispersing agent for producing graphene inks. As shown in FIG. 1C, both the SC-stabilized graphene (SC-Gr) dispersion and NanoS-stabilized (NanoS-Gr) graphene dispersion have shown to be stable for months, while the graphite flakes with stabilization can easily precipitate in hours after sonication in absence of any surfactants. The TEM analysis confirmed the formation of few-layer graphene sheets after the sonication processes (FIG. 1D).

Interfacial Property of Nanosurfactants.

Figure 2B:
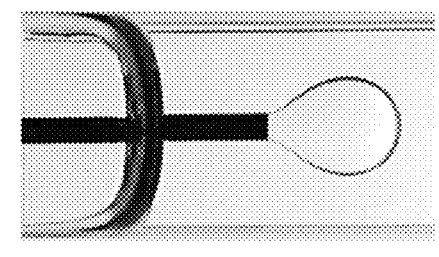
Figure 2C:
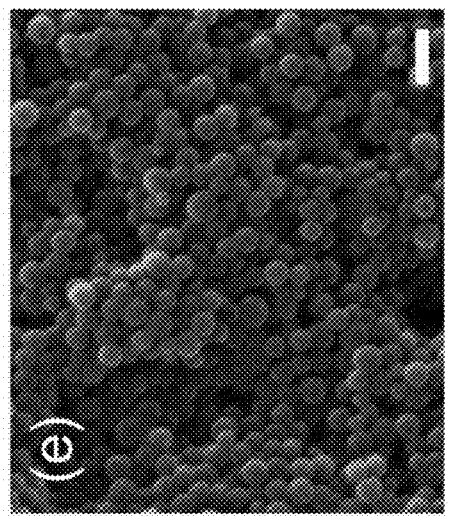
Figure 2D:
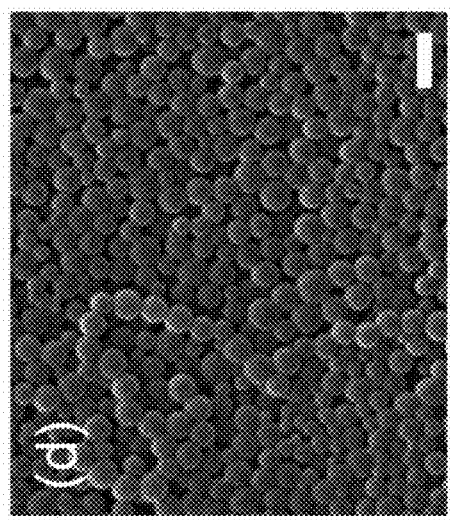
Figure 2E:
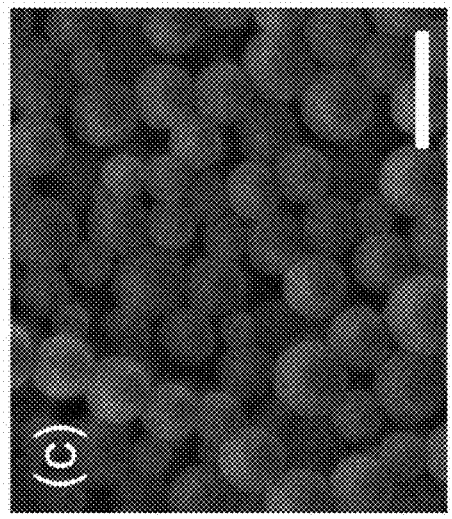

The interfacial properties of NanoS were investigated using pendant drop method. As a common tool of measuring the surface/interfacial tension, pendant drop method is based on the shape information of a critical liquid drop that hangs on a dosing needle. As shown in FIG. 2A, a critical drop of NanoS (0.5 wt % in water) and a drop of deionized water in dodecane were recorded. Similar to molecular surfactants, the NanoS was found to reduce the surface tension of water (in dodecane), as shown in FIG. 2B. At the interface between a water and dodecane, the nanosurfactant tends to form a monolayer which reduces surface tension. This explains a steady decrease in interfacial tension at concentration ranging from 0 to 0.5 wt %. Upon further increasing concentration, the NanoS will form a micelle. The concentration of the surfactant at which micelle formation starts is known as the critical micelle concentration (CMC). Increasing the nanosurfactant concentration beyond the CMC will not significantly change the surface tension (FIG. 2B). Such micellization effect on the surface tension of water was also commonly seen in other surfactant systems, such as anionic surfactant and amphoteric surfactants. The interfacial tension (IFT) value of NanoS solution (0.5 wt %) is comparable to some commercial surfactants, confirming the strong surfactant property of NanoS. As another example of interfacial application, NanoS was used as surfactants to stabilize polymerizable oil (i.e., styrene). After the emulsion polymerization, the polymerized emulsions were collected and the size of polystyrene particles were measured using scanning electron microscopy (SEM). As shown in FIGS. 2C-2E, the polystyrene particles were found mostly monodispersed with spherical shape, confirming the role of NanoS in reducing the surface energy at water/oil interfaces.

Ink Characterization.

Figure 3A:
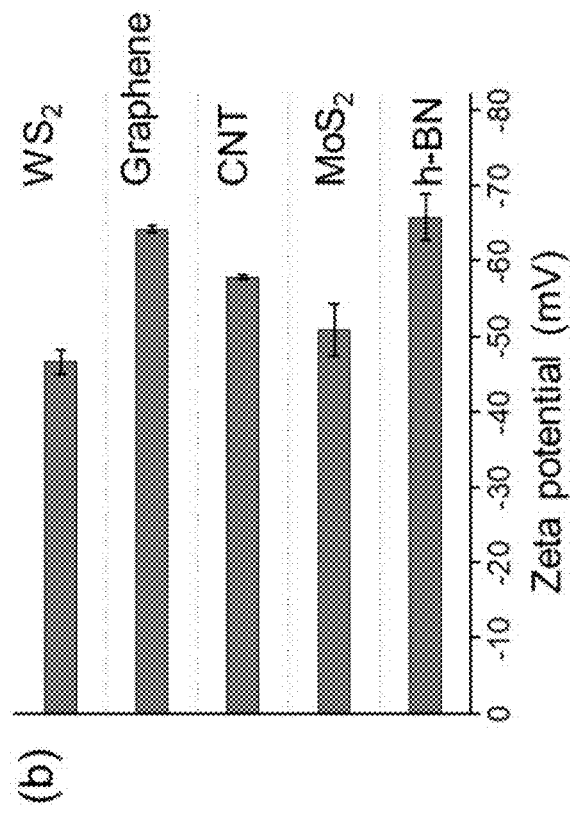
FIG. 3A shows photographic image of various ink dispersions.
Figure 3B:
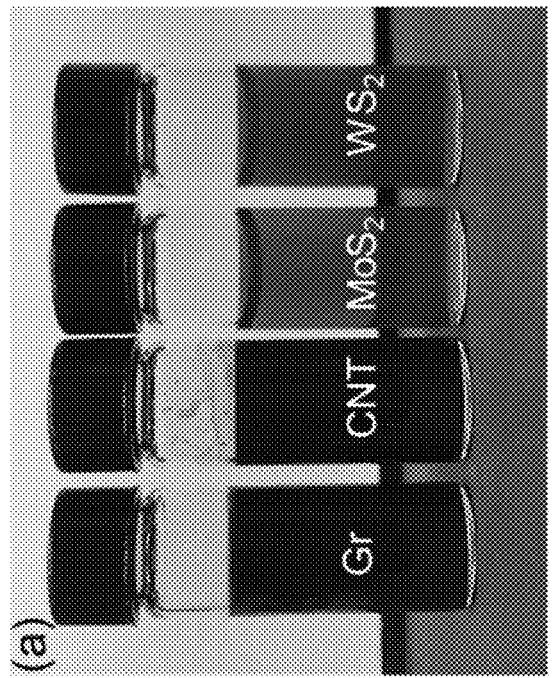
FIG. 3B shows zeta potential values of NanoS-stabilized WS2, graphene, CNT, MoS2, h-BN inks.
Figure 3C:
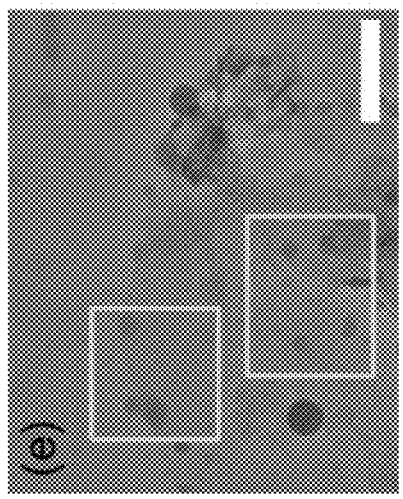
FIGS. 3C-3E show the TEM images of Gr (FIG. 3C), MoS2 (FIG. 3D), h-BN nanosheets (FIG. 3E), indicating the presence of QD surfactants on 2D sheets. Scale bar of FIGS. 3C-3E are 500 nm, 100 nm, and 200 nm, respectively.
Figure 3D:
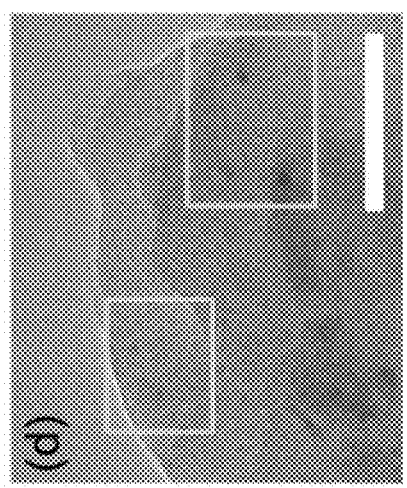
Figure 3E:
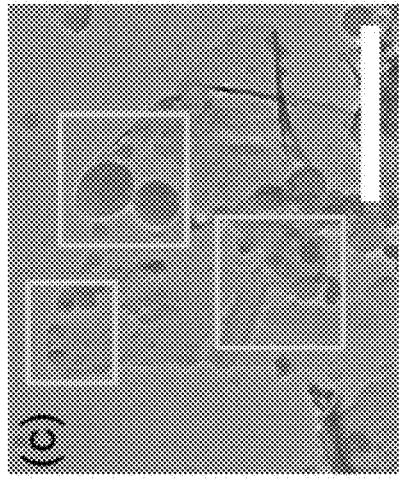

Owing to the strong capability of reducing the interfacial tension, the QD nanosurfactant exfoliated and stabilized several two-dimensional nanosheets from their bulk layered crystals, including graphene, MoS2, WS2, and h-BN (FIG. 3A). One-dimensional carbon nanotubes (CNT) can also be stabilized in aqueous phase by this NanoS. To evaluate the colloidal stability of nanoparticle inks, zeta potential technique was used to quantify the degree of electrostatic repulsion between adjacent, similarly charged particles in a dispersion. As shown in FIG. 3B, all NanoS-stabilized particles showed highly negative zeta potential values, confirming the good colloidal stability of nanomaterial inks. Such high stability of these 2D crystals inks can be attributed to the adsorbed NanoS on nanosheets, which can provide electrostatic stabilization against aggregation. The TEM images confirmed the successful synthesis of few-layer nanosheets after exfoliation with NanoS, and TEM analysis also revealed the presence of nanosurfactants on surface of 2D nanosheets (FIGS. 3C-3E). Compared with graphene sample, the TEM image of $MoS_2$ showed less NanoS nanoparticles on 2D sheets which is likely due to the weak bonding between NanoS and metal dichalcogenide.

Figure 4:
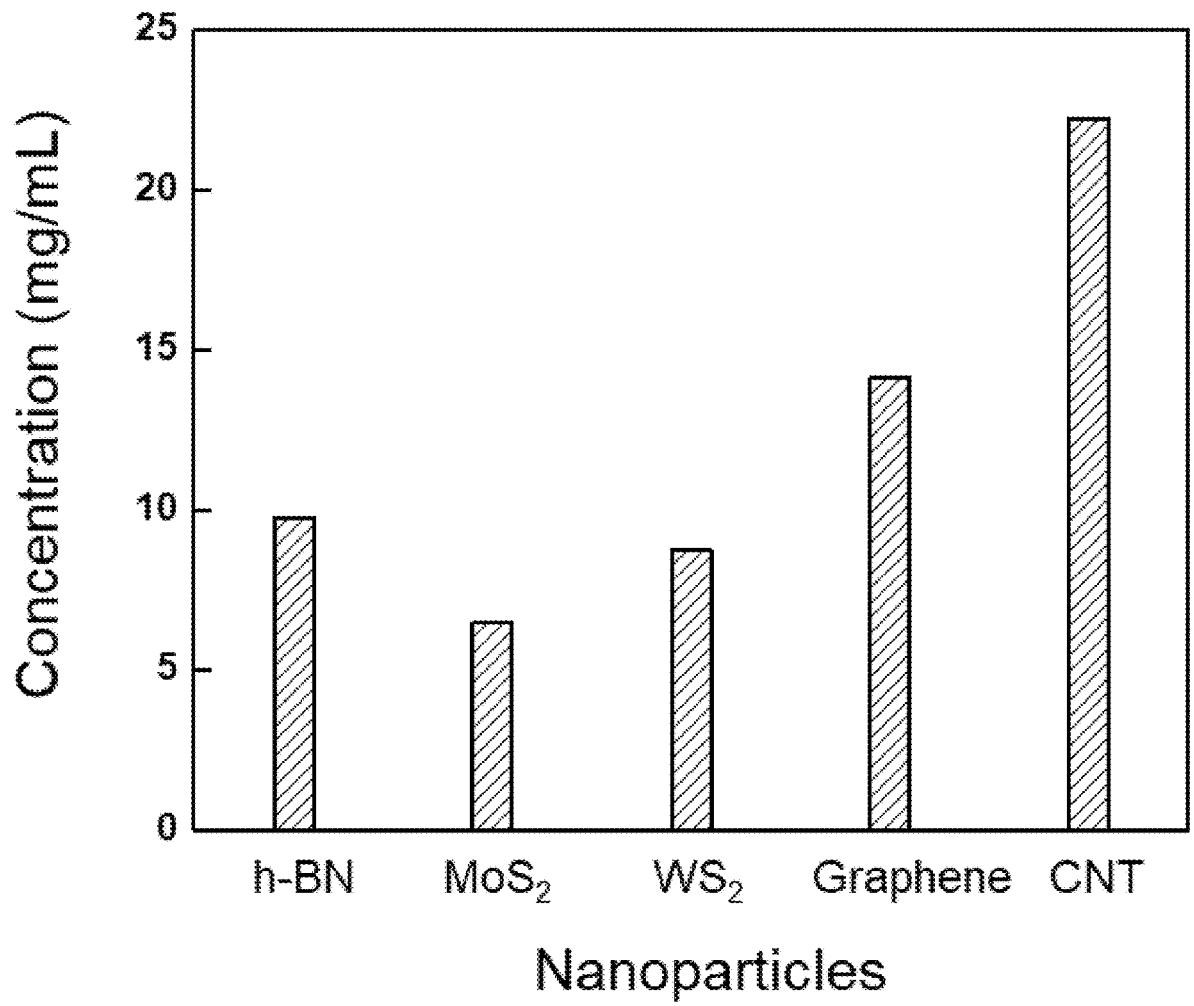
FIG. 4 shows the particle concentrations of NanoS-stabilized h-BN, $MoS_2$, $WS_2$, graphene, and CNT inks.

Among these stabilized nanoparticle inks, graphene and carbon NTs showed a higher particle concentration (14 and 22 mg/mL) than $MoS_2$ and $WS_2$ under the same exfoliation condition (FIG. 4). This is possibly due to that graphene and carbon nanotubes shared polyaromatic structures that can form non-covalent π-π bonding with carbon-based NanoS, whereas $MoS_2$ and $WS_2$ are transition metal chalcogenides without free π electrons and thus interact with NanoS via the Van der Waals force.

A homogeneous dispersion of graphene inks was produced by the addition of NanoS (5 mg/mL and 10 mg/mL, FIGS. 5A and 5B) without observable sedimentation or aggregation. However, in absence of NanoS, intense aggregation and even phase separation occurs (FIG. 5C). These results confirm the important role of NanoS in improving the colloidal stability of the graphene inks by suppressing the aggregation of graphene flakes in water phase. A direct comparison of graphene stability in water (I), ethanol (II), and aqueous solution of NanoS (III) demonstrated the good colloidal stability of NanoS-Gr ink (FIG. 5D).

Figure 6A:
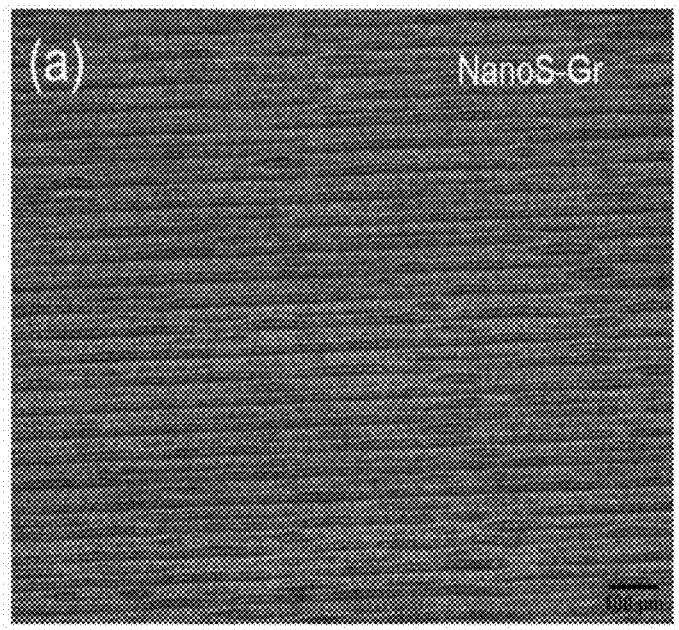
FIGS. 6A and 6B show optical microscopic images of printed films of freshly made NanoS-Gr (FIG. 6A) and Nano-Gr after 6 months (FIG. 6B). The inset shows the image of freshly made NanoS-Gr ink (right) and Nano-Gr ink after 6 months (left).
Figure 6B:
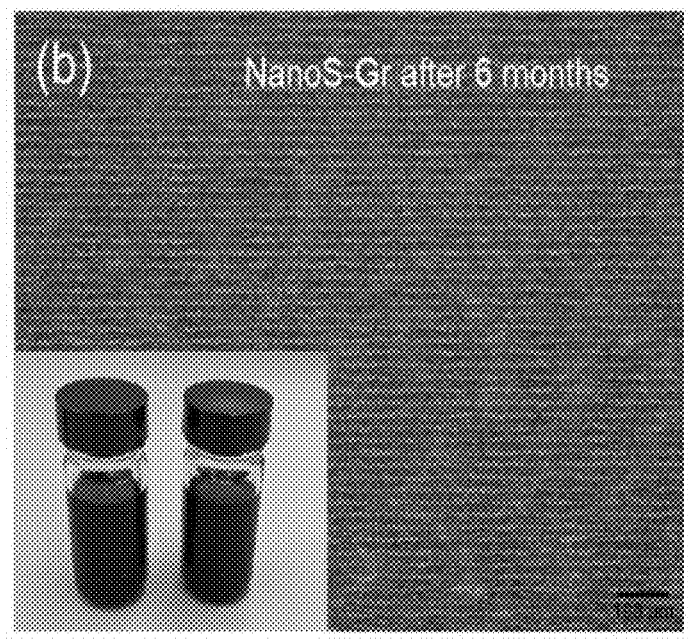
Figure 6C:
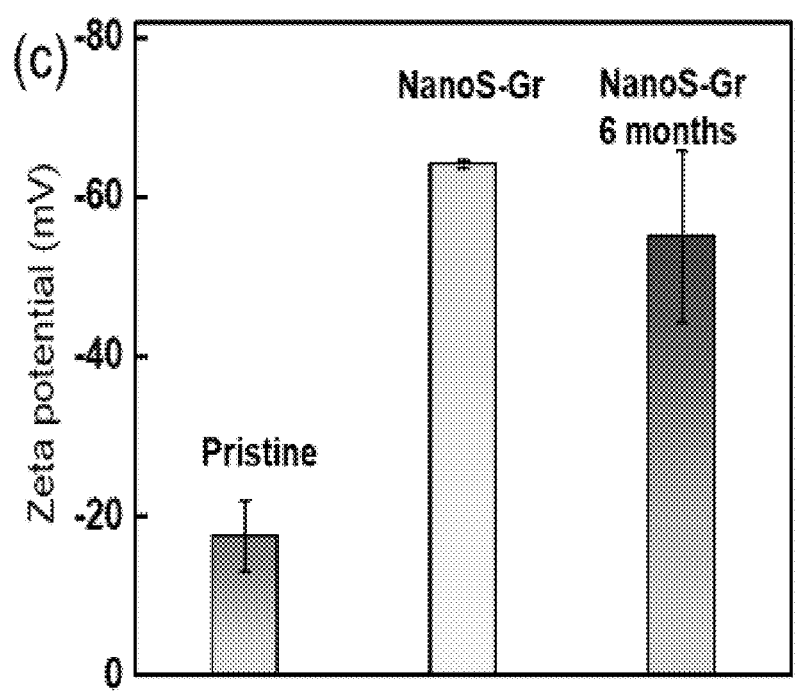
FIG. 6C shows comparison of zeta potential values of NanoS-Gr before and after 6-month storage.

To estimate the maximum storage time, NanoS-Gr from an old batch (prepared ~6 months ago) and a new batch were printed, and their printability were compared using similar printing parameters. Under the ink flow of 28 sccm and sheath flow of 18 sccm, both old batch and new batch of NanoS-Gr were easy to print without nozzle clogging and can form continuous thin films (FIGS. 6A and 6B). Therefore, the NanoS-stabilized graphene inks, in the range of the tested experimental conditions, are printable for at least 6 months. In addition, the colloidal stability of NanoS-Gr inks was quantitatively characterized by comparing their electrostatic surface charge over time (FIG. 6C). The surface charge of NanoS-Gr after 6 months remained highly negative (−55.1±10.8 mV), while a negative value greater than −40 mV would generally indicate a good colloidal stability of nanoparticles in dispersion. It was also observed that graphene without NanoS showed a poor surface zeta potential of −17.5 mV, indicating its poor stability in water in absence of NanoS.

Figures 7A, 7B:
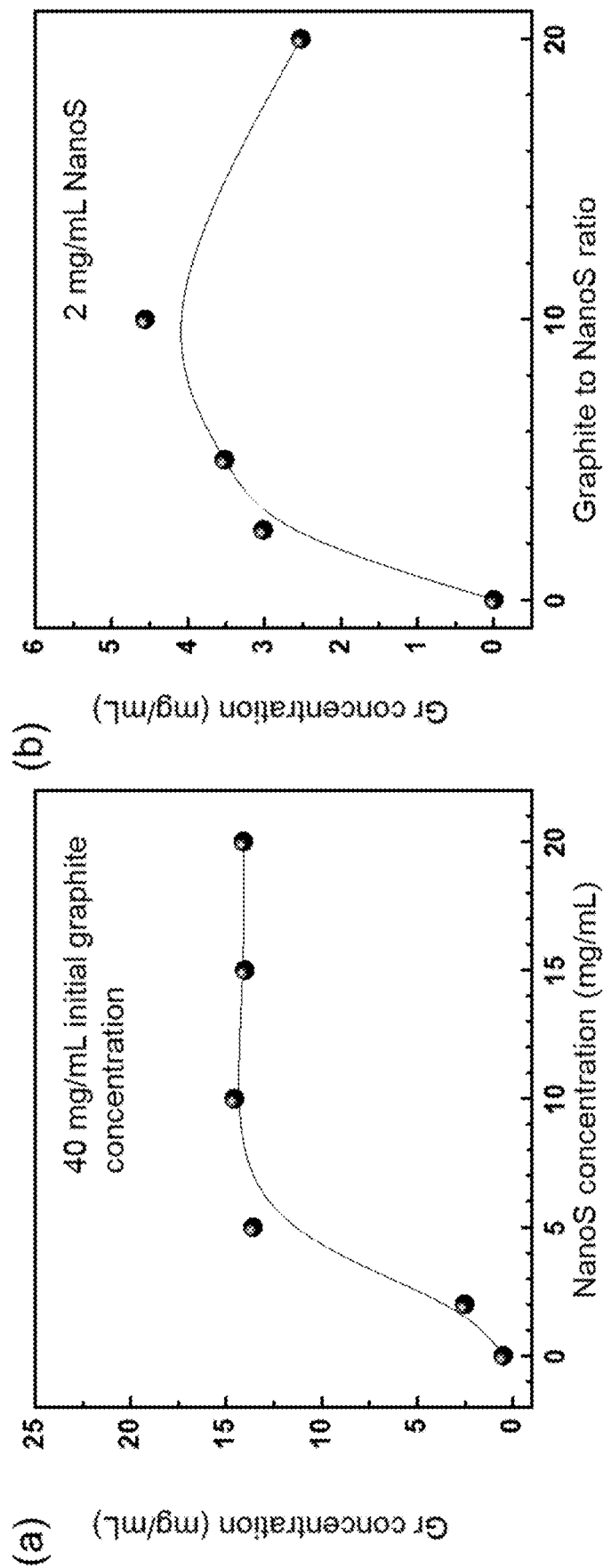
FIG. 7A shows the dispersed particle concentration of graphene at various NanoS concentration.
FIG. 7B shows the dispersed graphene concentration under different graphite to NanoS ratio (at a fixed 2 mg/mL NanoS).

The ranges of solid concentration and the graphite-to-NanoS ratios were investigated. Upon increasing the NanoS concentration, a maximum graphene concentration of 15 mg/mL was achieved at a given amount of initial graphite concentration (40 mg/mL), as shown in FIG. 7A. The graphite-to-NanoS ratio was varied from 0 to 20, calculating an optimum graphite-to-NanoS ratio of 9.5 under tested experimental conditions (FIG. 7B). It is worth mentioning that the maximum solid concentration and the optimum NanoS/solid ratios may change depending on sonication power/time, initial solid amount, and experimental temperature. The graphene concentration achieved in the present study (15 mg/mL) is much higher than that of graphene prepared by liquid-exfoliation method.

To better understand the sedimentation behavior of nanoparticle inks, a simulation model was proposed on the sedimentation velocity of nanoparticles in aqueous solution. The sedimentation behavior of a spherical nanoparticle in a liquid is governed by the balance of the forces acting upon the particle: i.e., the drag force (Fd) and the gravitational/buoyant force (Fg). For gravitational settling of a spherical nanoparticle, the opposing forces are described in Equation (1) and (2).

$$F_d = 6\pi\mu rv \quad (1)$$

$$F_g = 4\Sigma r^3 \Delta\rho g/3 \quad (2)$$

where μ is the solvent viscosity, r is the radius of the particle, Δρ is the density difference between the particle and the solvent, g is the gravity constant, and v is the sedimentation velocity.

As graphene nanosheets are two-dimensional nanomaterials, the effect of shape anisotropy as well as particle concentrations were also included. According to Stokes' law, the terminal sedimentation velocity (v0) of a spherical particle in a fluid is a function of the particle size, the force of gravity, the viscosity of the fluid and the density difference between the particle and the fluid, as shown in Equation (3). Taking into account the effect of particle concentration and anisotropy, the sedimentation speed (v) of two-dimensional nanoplates can be described in Equation (4), $$v_0 = \frac{D^2 \cdot \Delta\rho \cdot g}{18\mu} \quad (3)$$

$$v/v_0 = (1-w)(1-\phi)^{K_s} + w[1-(\phi+\phi_m)]^{K_{sphere}} \quad (4)$$

where D is the diameter of a spherical particle, Δρ is the density difference between the particle and the solvent, g is the gravity constant, μ is the solvent viscosity, φ is the volume fraction of nanoplates, φm is the extra exclude volume for oriented disks compared to spheres, KS describes the backflow effect at dilute concentrations of nanoplates, KSphere describes the backflow effect for spheres, and w is a logistic function that describes the transition between dilute and semi-dilute regime above which the restricted orientation of disk particles emerges. A detailed analysis of settling 2D nanoplates can be found in He et al. (Phys. Rev. E, 2010, 81, 026310), which is incorporated herein by reference in its entirety.

Figures 7C, 7D:
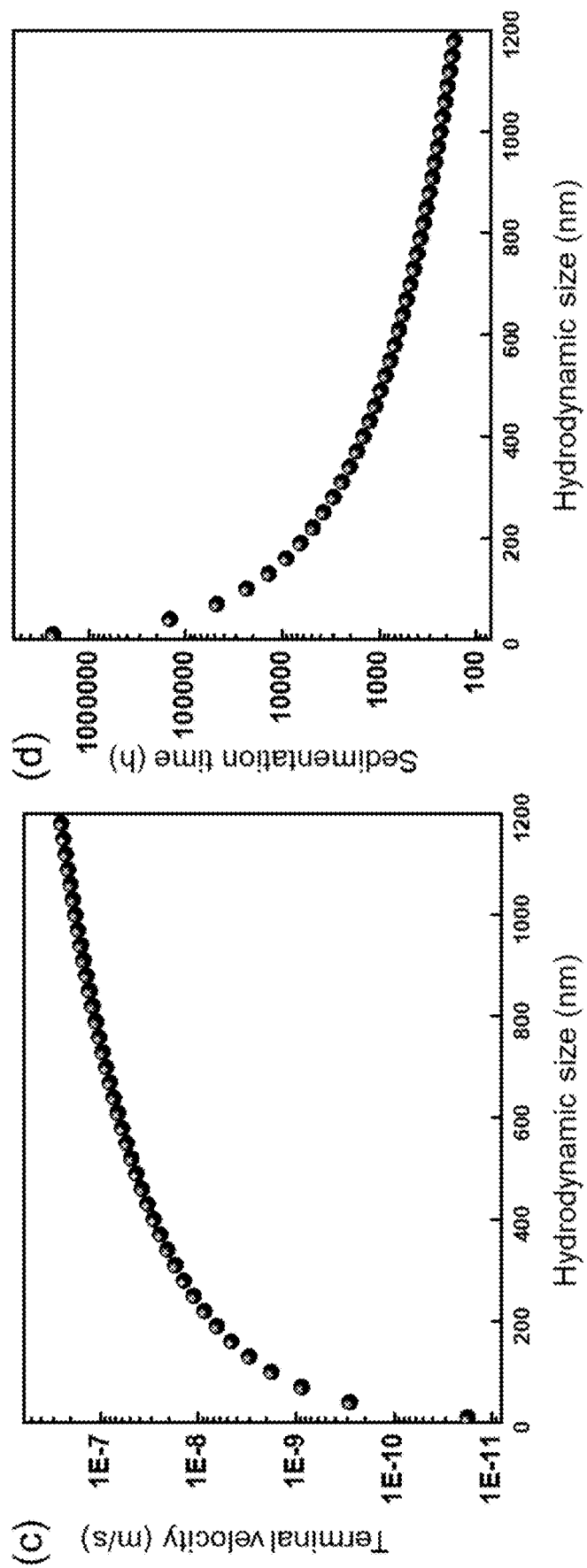
FIG. 7C shows calculated terminal velocity of particles with different sizes.
FIG. 7D shows the estimated sedimentation time of an individual 2D particle in an ink reservoir of 15 cm in height. An aggregate with large size will significantly accelerate the sedimentation process with a short sedimentation time.

For batch sedimentation, a backflow can flow opposite to the sedimentation direction to compensate the volume flux of settling colloidal particles. Therefore, the hindrance function (v/v0), which describes the dependence of settling speed on concentrations, was considered to simulate the sedimentation speed. Such hinderance function for aqueous system has been established in our previous study, which was used to estimate the sedimentation speed. Based on the Stokes' law with concentration and shape correction, the sedimentation velocity can be estimated as shown in FIG. 7C. There is a clear trend that the sedimentation velocity increases dramatically with the hydrodynamic size of particles. Thus, an increase in the hydrodynamic size during aggregation would significantly reduce the time for ink particles to sediment from dispersion, as shown in FIG. 7D. As indicated in FIGS. 5A-5D, graphene, without stabilization of NanoS, tends to aggregate and form agglomerated particle cluster with hydrodynamic size that increases over time (D>>1000 nm), leading to a fast sedimentation and a short shelf life.

Figure 8A:
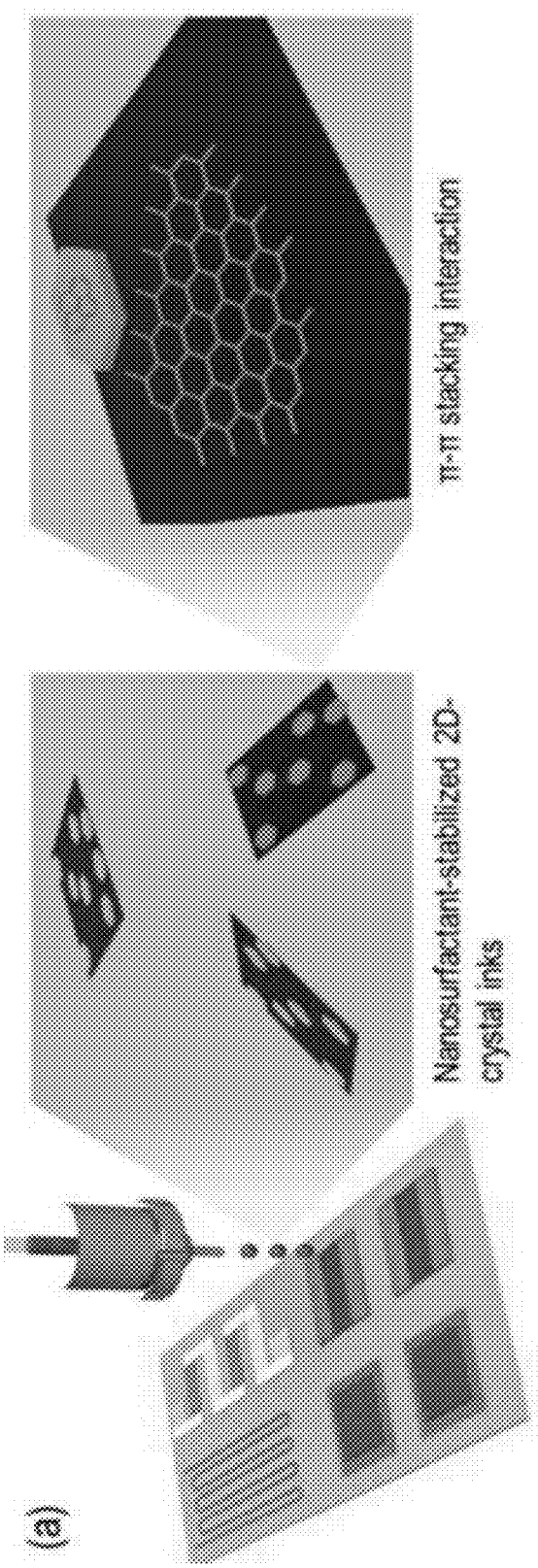
FIGS. 8A-8F show nanosurfactant-stabilized two-dimensional material inks and their properties.
Figure 8B:
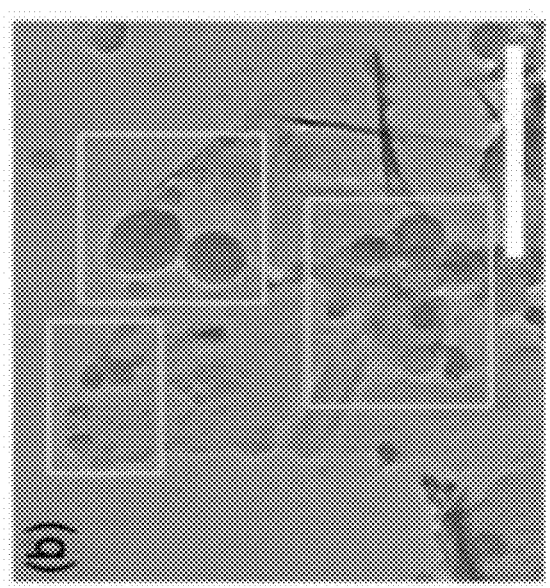
Figure 8C:
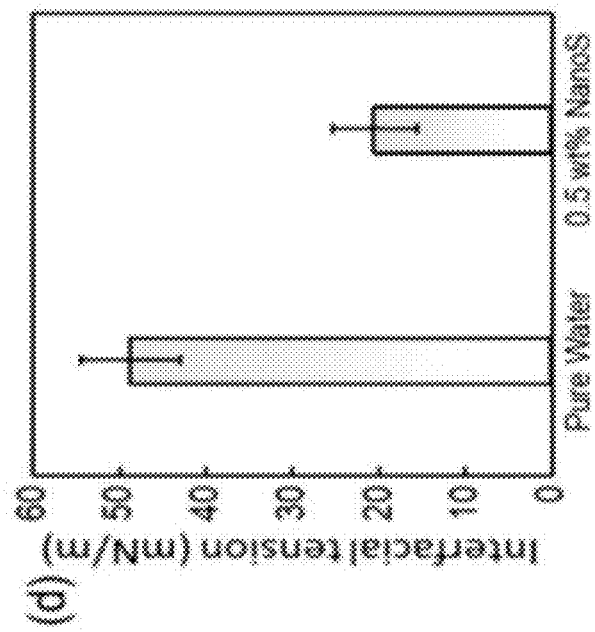
Figure 8D:
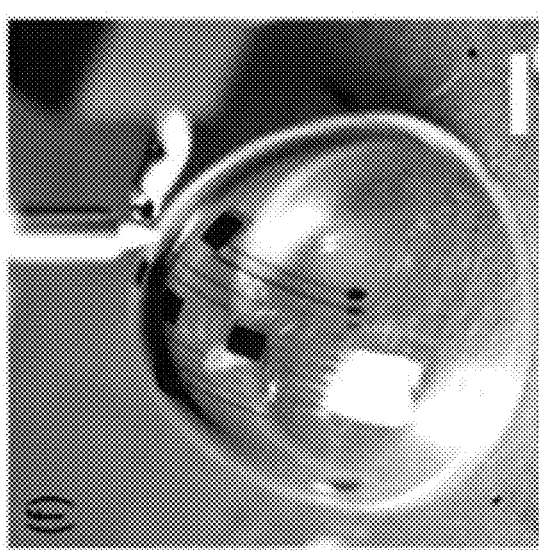

Thus, during the ink formulation, colloidal nanosurfactant (NanoS) is used to directly exfoliate 2D van der Waals crystals into few-layer nanosheets in aqueous dispersion (FIGS. 1A-1D). Taking graphene ink as an example, the colloidal NanoS is able to generate electrostatic stabilization for the graphene flakes, while no organic surfactant or polymer binder is introduced in inks. Due to the polyaromatic core structure, the graphene QD exhibits non-covalent π-π interactions with graphene (FIG. 8A), leading to long-term improvement in colloidal stability of graphene inks. The transmission electron microscopy (TEM) analysis of graphene inks confirms the non-covalent adsorption of NanoS particles on graphene nanosheets (FIG. 8B). The π-π stacking force between graphene and NanoS is a reminiscent of the interaction of graphene with small-molecule pyrene sulfonic acid sodium salt (PSA), which has been widely used in liquid exfoliation of few-layer graphene in water. Remarkably, such QD nanosurfactant can facilitate exfoliation and stabilization of several two-dimensional nanosheets from their bulk layered crystals, including zero band-gap graphene, medium band-gap TMD ($MoS_2$ and $WS_2$), and large band-gap h-BN, as shown in FIG. 8C.

Figure 8E:
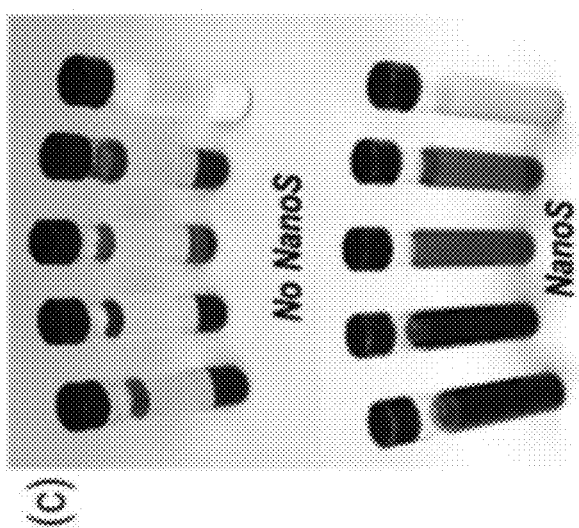
Figure 8F:
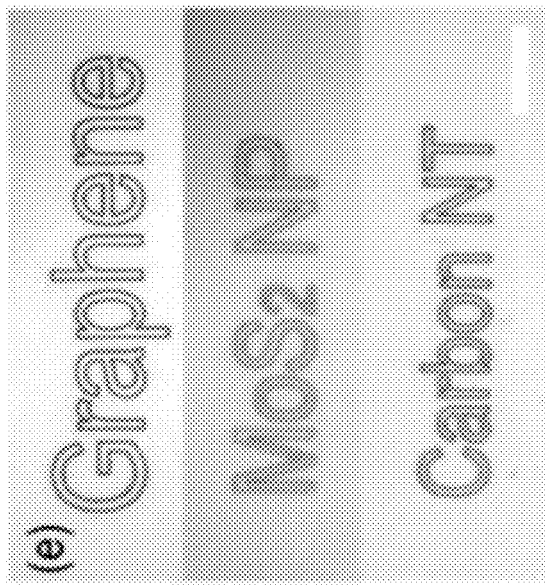

The interfacial tension measurement of water/dodecane system shows that the NanoS, similar to molecular surfactants, can effectively reduce the interfacial tension of water phase (FIG. 8D and FIGS. 2A-2E). Moreover, the NanoS, in addition to stabilizing 2D nanomaterials, can alleviate the aggregation of one-dimensional (1D) carbon nanotubes (NT) in water (FIG. 8C). While pristine particles without NanoS stabilization tend to aggregate and sediment in a few hours (FIG. 8C, top), these 2D flakes and 1D nanotubes with NanoS were proven to be highly colloidal stable in water (up to months) and showed high zeta potential values (FIGS. 3A-3E, FIGS. 6A-6C). FIG. 8E shows some examples of printed patterns obtained with water-based inks including graphene, MoS2, and carbon nanotubes inks on paper substrates. Among those stabilized nanoparticle inks, graphene and carbon NTs showed a higher particle concentration (14 and 22 mg/mL) than $MoS_2$ and $WS_2$ under the same exfoliation condition (FIG. 4). This is due to that graphene and carbon NT both contain sp2 carbon structures that can form non-covalent π-π bonding with QD NanoS, whereas $MoS_2$ and $WS_2$ are transition metal chalcogenides without free π electrons and thus interact with NanoS via only van der Waals force. These results are comparable with the molecular counterparts, such as PSA or SC surfactant. Due to the high colloidal stability of 2D crystal inks, a 3D conformal pattern can be readily printed, as shown in FIG. 8F.

Example 2 Printing Performance

Printing Conditions.

The aerosol jet printing uses the aerodynamic focusing of aerosolized droplets to reliably transfer inks to surfaces. This approach begins with aerosolizing inks using sonication or gas pressure, forming aerosolized droplets with a size of 2-5 microns. Then, nitrogen was used as the carrier gas to transport the aerosol cloud to a printhead, where a co-flowing sheath gas focuses the droplets to a 10-100 μm-diameter jet that was finally deposited on substrates. The printing behavior of NanoS-stabilized graphene inks were systematically studied by varying several printing parameters, including flow rate of ink aerosol (ink flow), flow rate of sheath gas (sheath flow), and printing speed. As shown in FIG. 9A, the printed lines become less visible as gas flow rate of graphene ink decreases from 32 to 20 sccm (standard cubic centimeters per minute). This can be explained by the fact that less graphene particles were transferred to surfaces under low ink flow. Although the line visibility seems to be similar under different sheath flows, the width of printed lines decreases when increasing the sheath flow rate (FIG. 9B). This provides a tool to adjust line resolution during the aerosol jet printing. The printing speed also plays an important role as a higher printing speed leads to less ink particle deposited on surfaces. As shown in FIG. 9C, the printed amount of graphene increases significantly with decreasing printing speed from 21 to 3 mm/s. A typical printed line with ink flow of 28 sccm and sheath flow of 20 sccm was shown in FIG. 9D.

Printed Films.

Figure 10A:
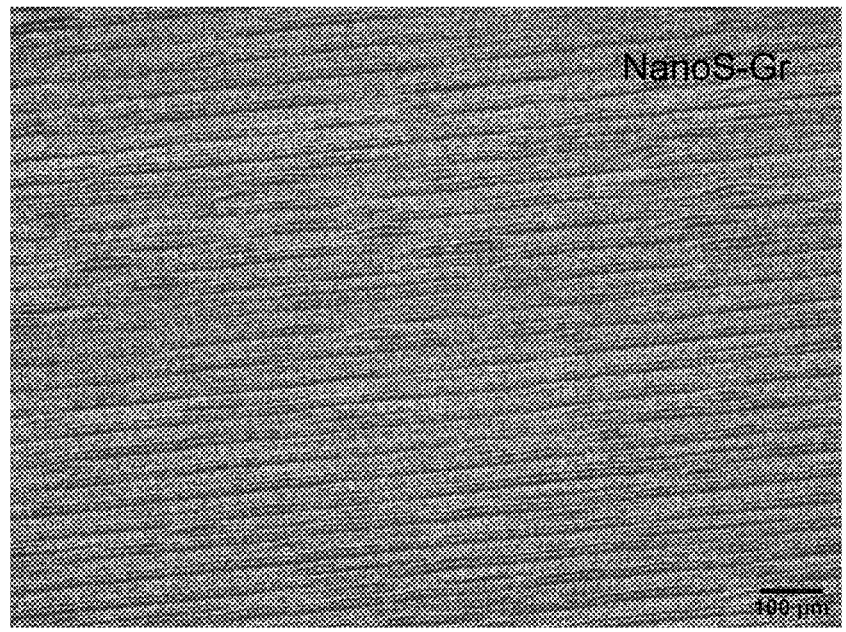
FIG. 10A shows the optical microscopic image of printed NanoS-Gr film.
Figure 10B:
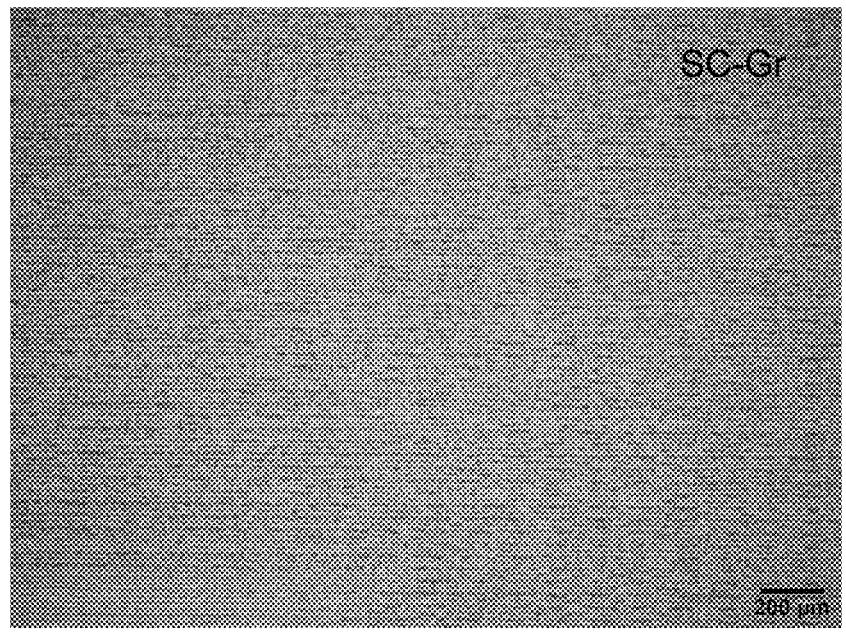
FIG. 10B shows the optical microscopic image of printed SC-Gr film.
Figure 10C:
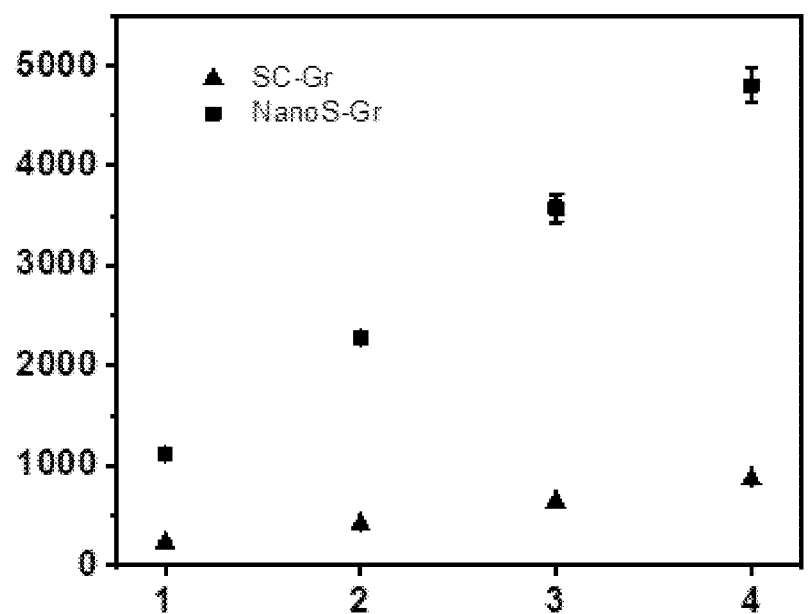
FIG. 10C shows the film thickness of NanoS-Gr and SC-Gr films with different printing passes.
Figure 10D:
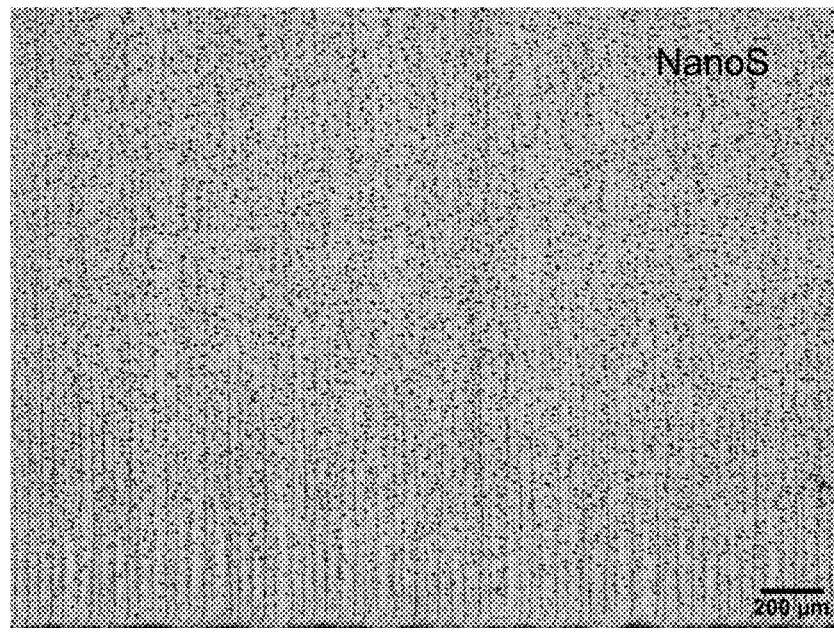
FIG. 10D shows the printed film of pure NanoS inks showing micrometer-sized bubbles.

FIGS. 10A and 10B show the optical microscopic image of printed NanoS-Gr film and printed SC-Gr film. Both printed films of NanoS-Gr and SC-Gr are continuous without significant defects; however, the thickness of different printed films varies. The thickness of the printed film increases as a function of print passes, with each additional pass adding 1228±44 nm in thickness prior to annealing (FIG. 10C). Compared with nanosurfactant-stabilized graphene, the SC-Gr showed a lower thickness, likely due to the lower concentration of the SC-Gr inks. In addition to graphene inks, pure NanoS films was also printed (FIG. 10D). Although the substrate was fully covered by printed NanoS, the formation of small-sized bubbles was observed, which is likely due to the foaming effect of nanosurfactants.

Figure 11A:
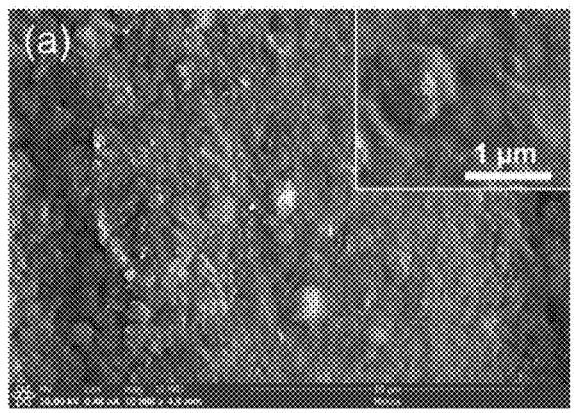
FIG. 11A shows the SEM image of printed NanoS-Gr film. The inset showed a dense morphology without observable holes due to the filling effect of NanoS.
Figure 11B:
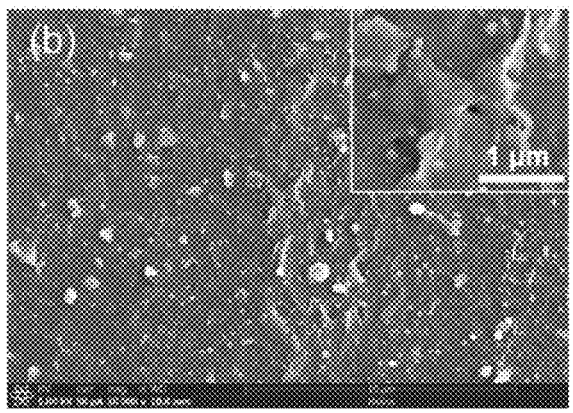
FIG. 11B shows the SEM image of printed SC-Gr film. The inset showed loosely packed film with the existence of some pores between graphene flakes.

The SEM image of the printed NanoS-Gr film showed a dense morphology without observable holes due to the filling effect of NanoS (FIG. 11A). In comparison, the SEM image of the printed SC-Gr film showed loosely packed film with pores between graphene flakes (FIG. 11B). To better understand the improved mechanical properties of NanoS-Gr, morphological and structural characterization were conducted using high-resolution transmission electron microscopy (HRTEM) and focused ion beam scanning electron microscopy (FIB-SEM) analysis. In HRTEM images (FIG. 12C), it was clearly observed the NanoS sandwiched between 2D graphene flakes. In addition, FIB-SEM revealed a densely packed interface for the NanoS-Gr at the cross-sectional region (FIG. 12B), whereas nanoscale voids were clearly found in SC-Gr (FIG. 12A), indicating the improved density and interfacial connections of NanoS-Gr also contributed to the better mechanical strength of printed films.

Mechanical Test of Graphene Films.

Figure 13A:
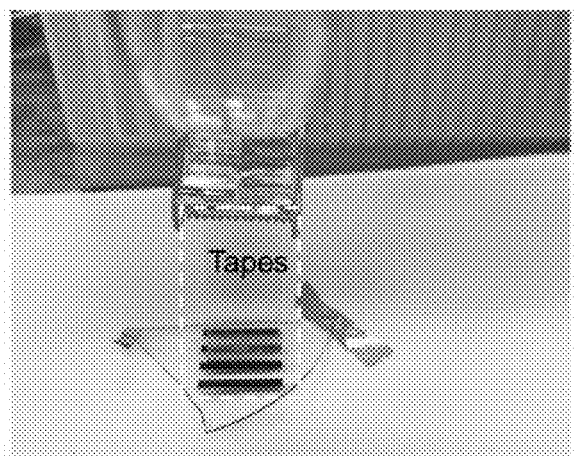
FIG. 13A shows camera image of tape pulling process at 90°.
Figure 13B:
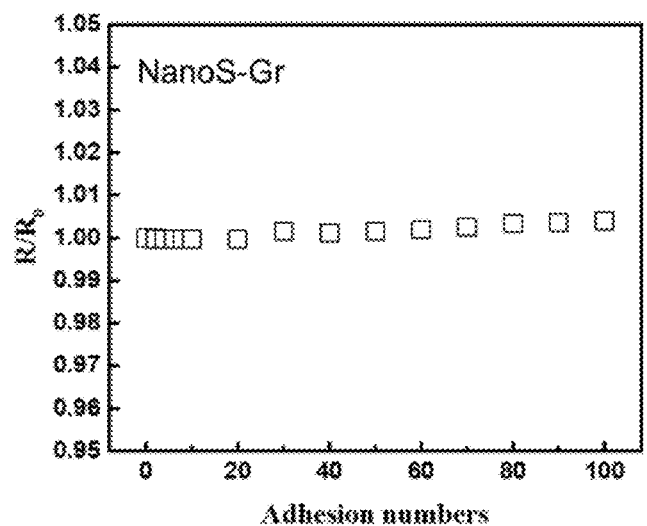
FIG. 13B shows the relative resistance ($R/R_0$) of NanoS-Gr versus the number of tape pulling.
Figure 13C:
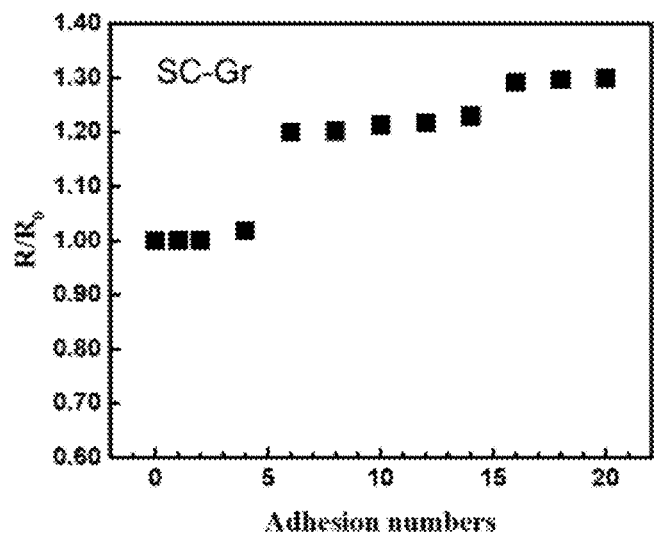
FIG. 13C shows $R/R_0$ of SC-Gr versus number of tape pulling.
Figure 14A:
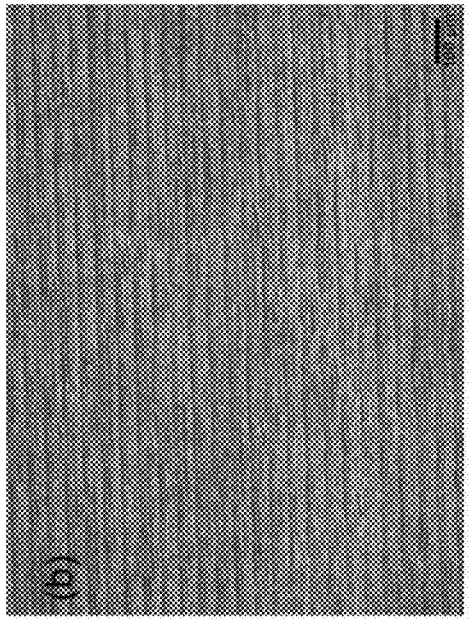
FIGS. 14A and 14B show optical microscopic images of printed NanoS-Gr film before (FIG. 14A) and after tape pulling (FIG. 14B).
Figure 14B:
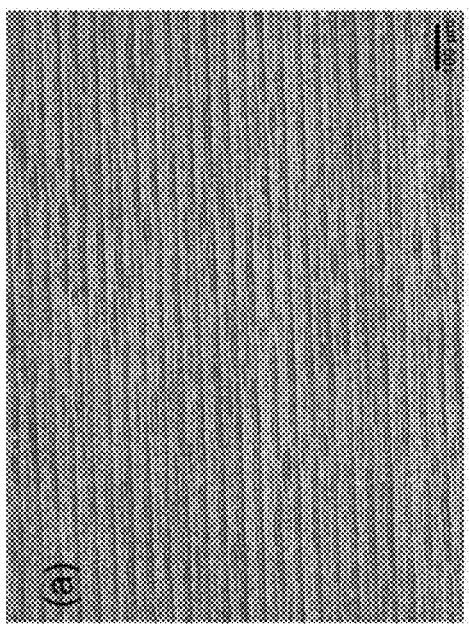
Figure 14C:
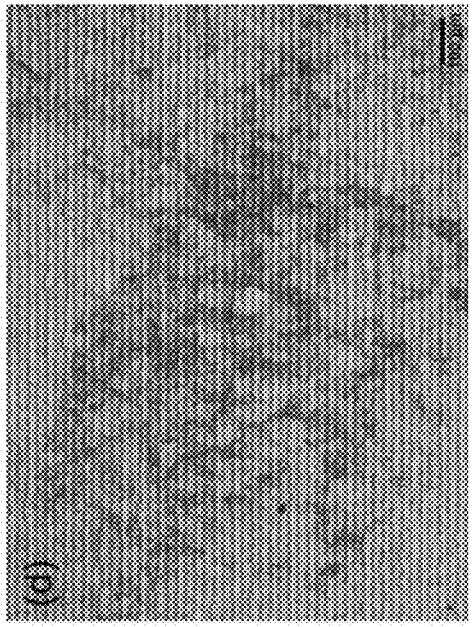
FIGS. 14C and 14D show optical microscopic images of printed SC-Gr film before (FIG. 14C) and after tape pulling (FIG. 14D).
Figure 14D:
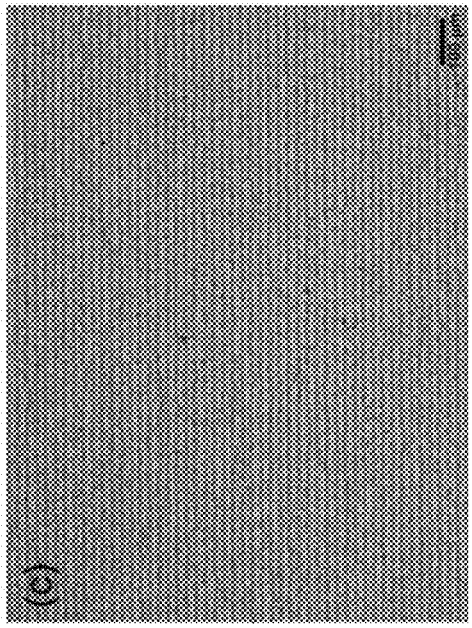

As a typical durability test, adhesive tapes (3M Scotch Double Sided Removable Tape, USA) were used to evaluate the mechanical robustness of printed graphene films. After applying the Scotch tape on printed films, a metal object of 50 g was used to apply constant pressure on tapes for ensuring the good contact between adhesive tape and graphene film. Then, the applied tape was pulled out at 90° and relative electric resistance $R/R_0$ was measured (FIG. 13A). The NanoS-Gr showed high stability against adhesion test which only introduce a marginal increase (0.4%) for 100 adhesion cycles (FIG. 13B), while a 29.9% resistance increase in SC-Gr samples was observed for after merely 20 adhesion cycles (FIG. 13C). Microscopic images of graphene films before and after tap pulling were recorded, as shown in FIGS. 14A-14D. Considerable amount of graphene was lost in SC-Gr films after tape pulling, where only slightly change was observed in NanoS-Gr films. This indicates that the NanoS improved the bonding strength of graphene flakes, allowing the improved mechanical robustness against adhesive tape pulling.

Figure 15A:
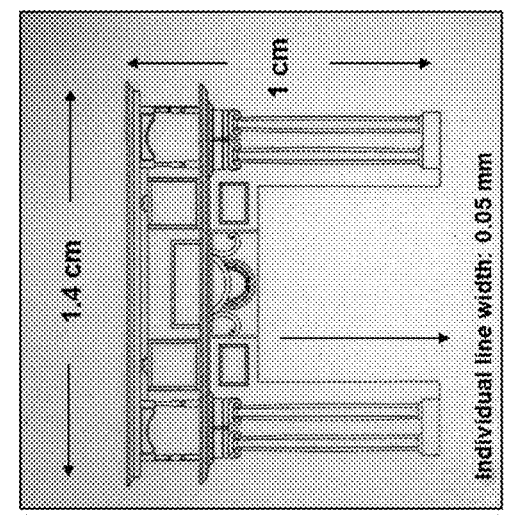
FIGS. 15A-15F show printing performance of nanosurfactant-stabilized graphene inks.
Figure 15B:
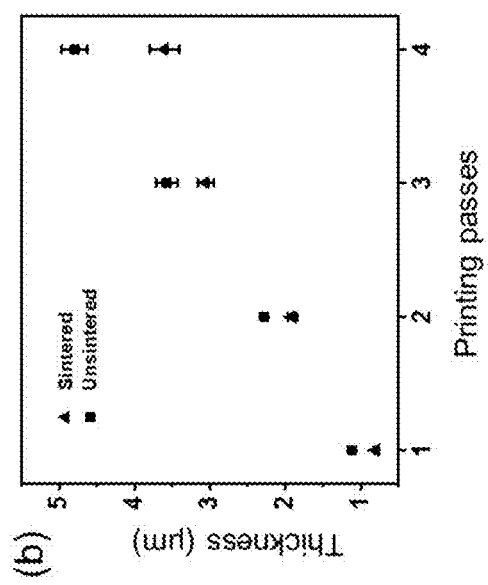

To understand how the nanosurfactants affect the printing process, the printing performance of NanoS-stabilized graphene inks was systematically studied. As shown in FIG. 15A, FIGS. 9A-9D, and FIGS. 10A-10D, the printed graphene patterns on various substrates ($SiO_2$, polyimide, and glass) exclusively show good continuity and uniformity without an observable coffee-ring effect. The printing behaviors of NanoS-stabilized graphene inks were investigated by varying several printing parameters (e.g., flow rate of ink aerosol, flow rate of sheath gas, and printing speed), revealing on-demand control of the line width from ≈15 to 50 μm (FIGS. 9A-9D). Such smooth printing of NanoSbased inks further confirms the high colloidal stability of the ink, where no disadvantageous particle aggregation is observed. Compared with inkjet printing techniques requiring relatively low ink viscosity (normally <30 mPa s), the aerosol jet printing herein can tolerate ink viscosity ranging from 1 mPa s to around 2500 mPa s, enabling high particle loading without ink clogging during printing. One advantage of high-concentration inks is the rapid fabrication of thick and dense films for only a few print passes, significantly saving the printing time in device fabrication. As shown in FIG. 15B, the thickness of the printed film increases as a function of print passes, with each additional pass adding 1228±44 nm before annealing, or 921±102 nm after thermal annealing. While some graphene films involving molecular surfactant were reported to show 50-80% thickness reduction during annealing processes due to the decomposition of organic stabilizers and densification of the graphene network, the NanoS remains bonded with graphene flakes after thermal annealing (200° C.) and thus the film thickness does not change significantly during this process. A scanning electron microscope (SEM) analysis (FIGS. 11A and 11B, FIGS. 12A-12C) shows the existence of small pores in the printed film with sodium cholate stabilized graphene (SC-Gr), which are likely formed due to the surfactant removal during annealing process, whereas a uniformly dense film is observed for NanoS-stabilized graphene (NanoS-Gr).

Figure 12A:
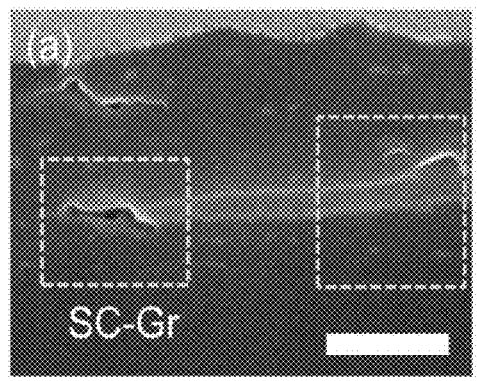
FIG. 12A show the SEM image of cross-section SC-Gr film.
Figure 12B:
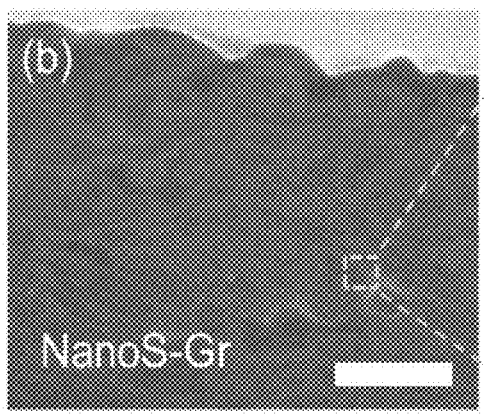
FIG. 12B shows the SEM cross-section view of printed NanoS-Gr film.
Figure 12C:
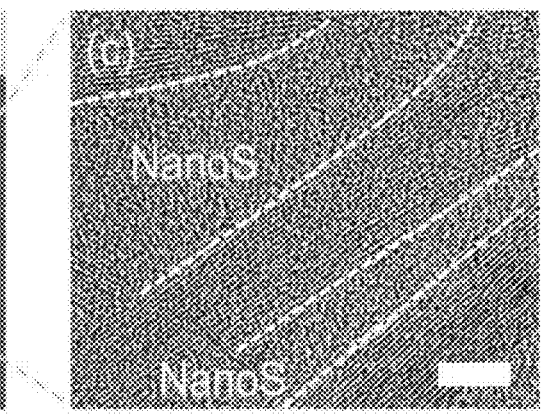
FIG. 12C shows the TEM image showing the NanoS sandwiched between Gr flakes in the printed film. The scale bars of FIGS. 12A, 12B, and 12C is 200 nm, 300 nm, and 5 nm, respectively.
Figure 15C:
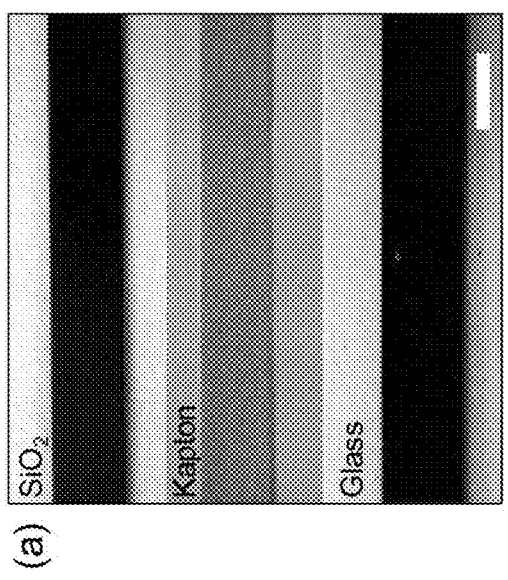
Figure 15D:
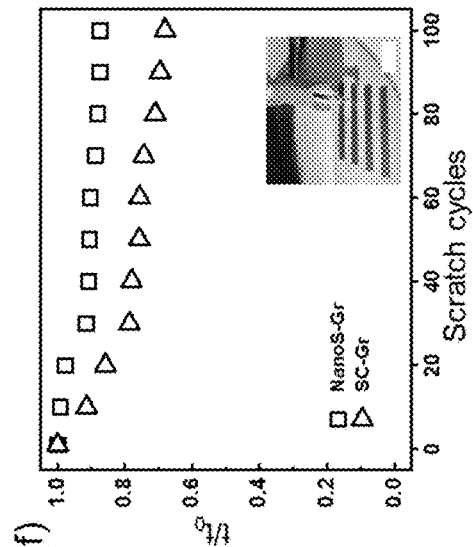
Figure 15E:
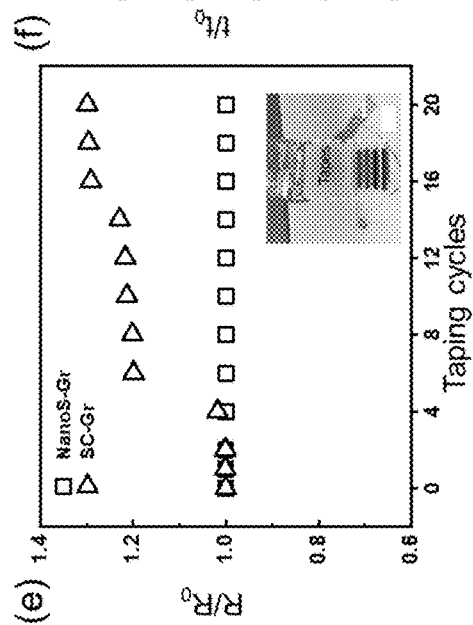
Figure 15F:
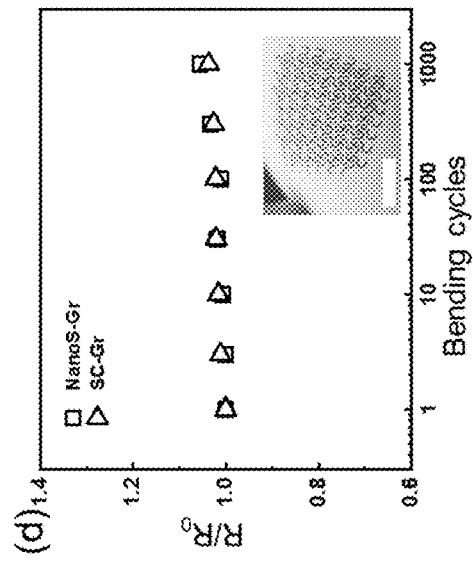

The high particle loading also allows the printing of high-resolution pattern with the use of single-pass printing (FIG. 15C). To explore the possibility of applying the nanosurfactant ink for the fabrication of flexible devices, the structural stability of the printed NanoS-Gr film and SC-Gr film were evaluated. While both films demonstrated very comparable flexibility, as indicated by negligible resistance changes during the 1000 bending cycles (FIG. 15D), the NanoS-Gr film exhibited far superior robustness during the taping and scratching tests. While a 29.9% resistance increase in the SC-Gr film was observed after 20 taping cycles, the NanoS-Gr film showed negligible change in resistances even after 100 taping cycles (FIG. 15E and FIGS. 13A-13C). Microscopic images of graphene films before and after tap pulling were recorded (FIGS. 14A-14D). A considerable amount of graphene lost in SC-Gr films was observed after tape pulling, while only slight changes was observed in NanoS-Gr films. This indicates that the resistance change in SC-Gr can be attributed to film damage during taping cycles. In scratching test, the NanoS-Gr film shows significantly less thickness reductions than that of the SC-Gr film after 100 scratching cycles (FIG. 15F), suggesting enhanced bonding between neighboring graphene flakes due to the introduced NanoS. The improved mechanical property of NanoS-Gr is mainly attributed to the enhanced film density and interfacial bonding as a result of the NanoS sandwiched between 2D graphene flakes (FIGS. 12A and 12B). These results indicate that the NanoS not only behaves as a surfactant in ink formulation, but also serves as an interfacial bonding agent for the printed 2D flakes, eliminating the need of additional polymer binder in ink formulation.

Example 3 Optoelectronic Properties

Spectroscopy.

Figure 16A:
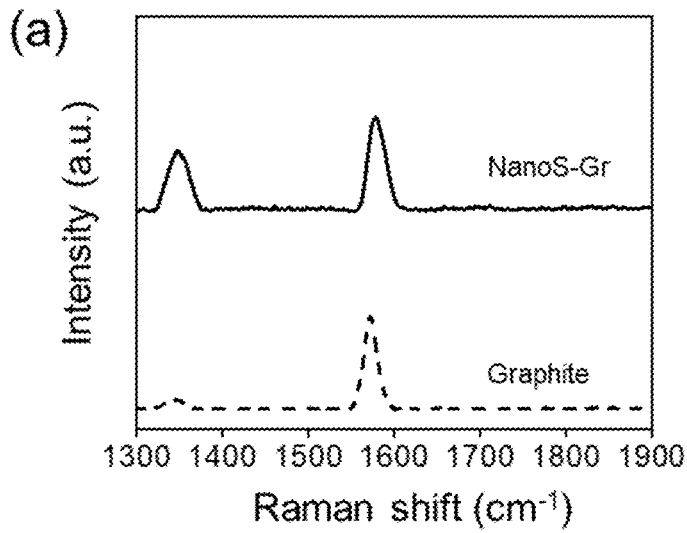
FIG. 16A shows the Raman spectra of NanoS-Gr and graphite.
Figure 16B:
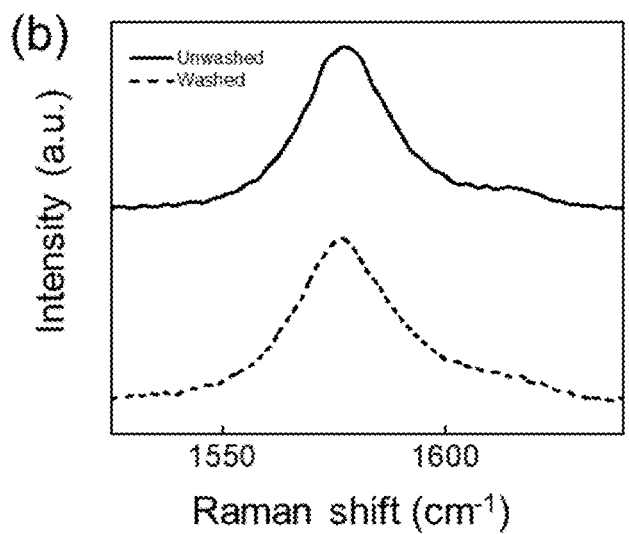
FIG. 16B shows the Raman spectra of washed and unwashed NanoS-Gr.
Figure 16C:
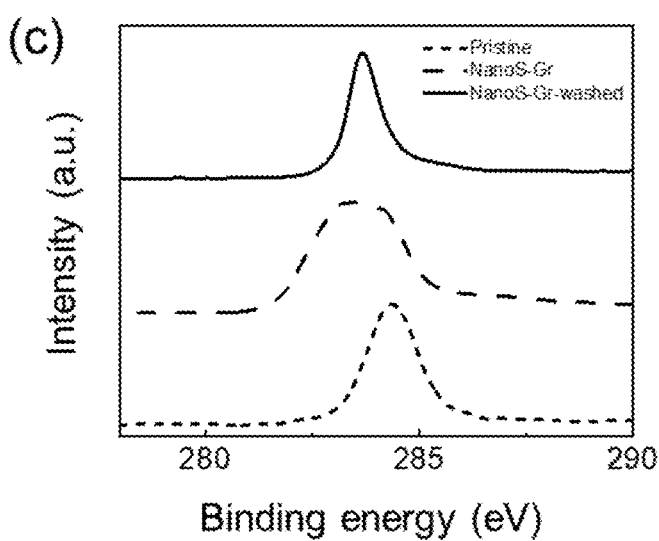
FIG. 16C shows the relative binding energy of C1s among different graphene samples.

The Raman spectra of graphene samples showed a much stronger D band signal at around 1350 cm-1 in NanoS-Gr sample (FIG. 16A). This is likely due to the introduced disordered structure by attaching NanoS on graphene. FIG. 16B shows the Raman spectra of NanoS-Gr before and after washing excessive NanoS, where the G peaks of two graphene samples showed a similar blue shift in comparison with that of pristine graphite, though a slightly more blue shift (~0.7 cm-1) is seen for NanoS-Gr before washing due to a likely stronger doping effect with higher amount of NanoS dopants. The X-ray photoelectron spectroscopy (XPS) was used to further investigate the doping effect of NanoS-Gr (FIG. 16C). Although C1s peak is frequently set to a binding energy of 284.8 eV (sp3-bonded carbon) as a correction reference due to its convenience; however, the XPS spectra here were not calibrated and the relative position of binding energy was examined to directly compare the shift in C1s spectra of different samples. After doped with NanoS, the graphene sample showed a considerable shift on binding energy. This shift in binding energy is even seen in NanoS-Gr that had been thoroughly washed with deionized water. The shift to lower binding energy suggests a possible p-type doping on graphene, as seen in other doped graphene systems.

Figure 16D:
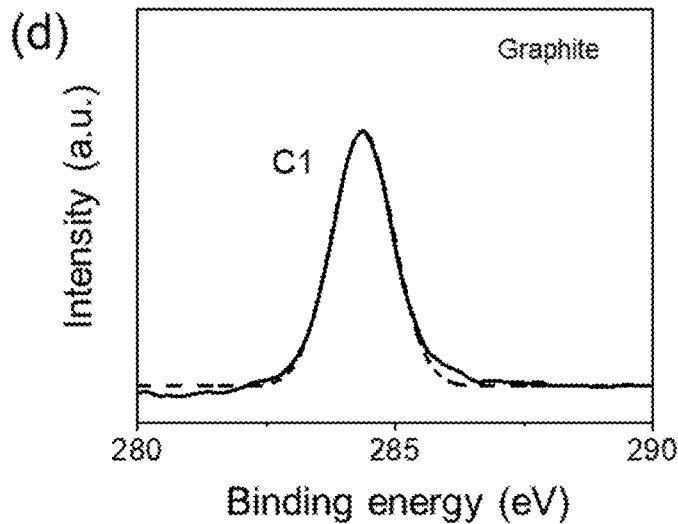
FIGS. 16D-16F show C1s spectra of graphite (FIG. 16D), NanoS-Gr (FIG. 16E), and washed NanoS-Gr (FIG. 16F).
Figure 16E:
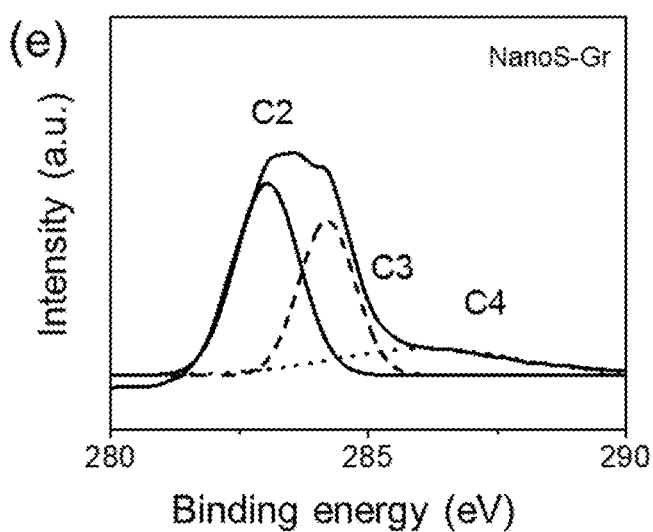
Figure 16F:
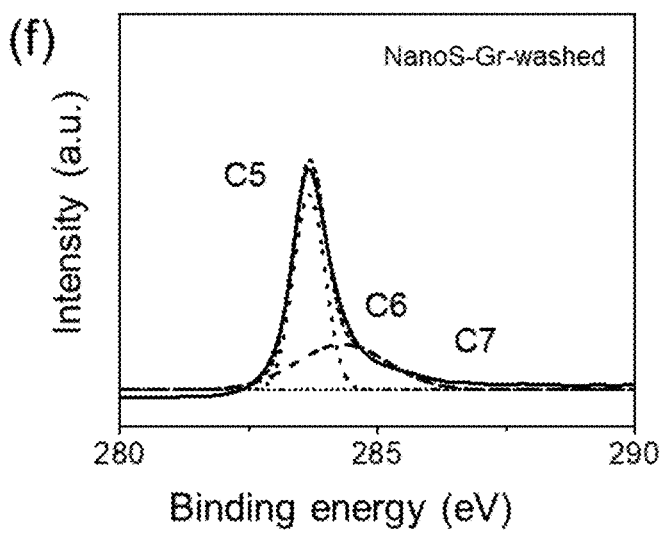
Figure 16G:
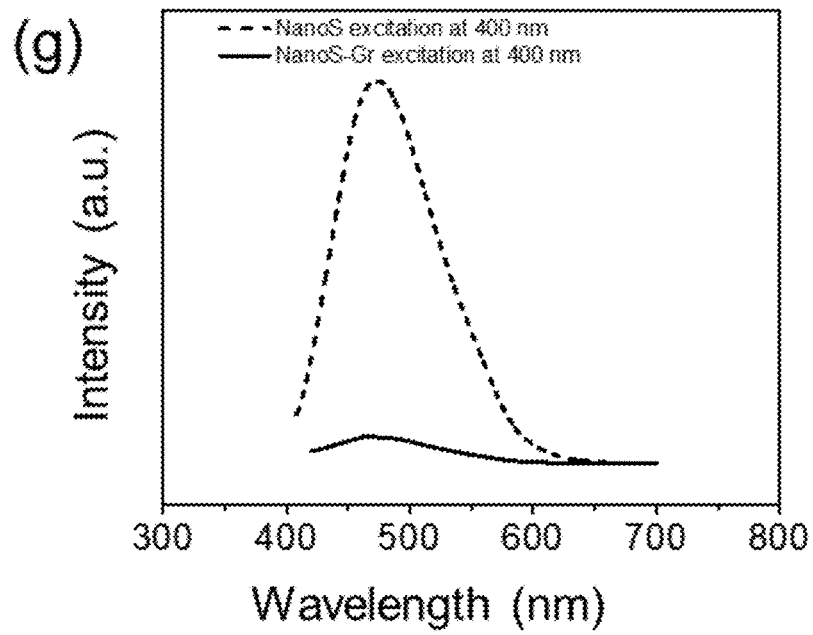
FIG. 16G shows PL spectra of NanoS and NanoS-Gr, showing a strong fluorescence quenching effect.
Figure 16H:
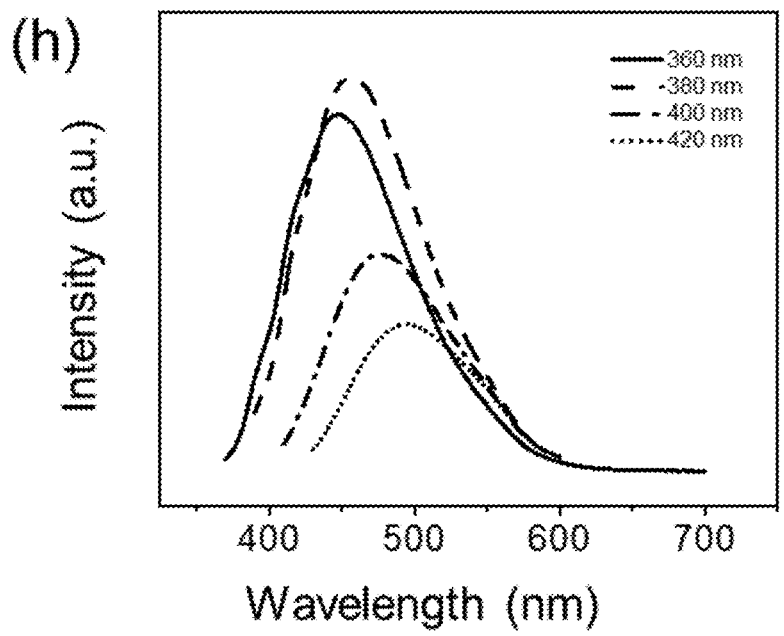
FIG. 16H shows PL spectra of NanoS at different excitation wavelengths.

To further understand the interaction of NanoS with graphene, peak fitting was conducted on the graphene samples to identify the chemical environment of carbon elements. As functionalized graphene will have a complex C1s spectrum that contains sp2 and sp3 components, the mixed sp2/sp3 spectra were separated, as shown in FIGS. 16D-16F. The NanoS-Gr clearly showed a mix of sp2 (C2) and sp3 components (C3), while pristine graphite predominately showed sp2 carbon (C1). The significant shift of sp2-bonded carbon indicates that the heavily doped effect by NanoS adsorbed on graphene. After thoroughly washing with deionized water, the shift in binding energy of sp2 carbon (C5) was relatively alleviated (~0.5 eV), while the sp3 component (C6) was considerably reduced due to the removal of excessive NanoS which contains large amount of disordered structure such as C—O (C4 and C7). It is worth mentioning that the shape and relative position may also be influenced with the surface chemistry, film thickness and nature of the sample. The band gap of NanoS was estimated using photoluminescence (PL) spectroscopy, revealing the photoluminescence peak for the pure NanoS at wavelengths of 463 nm (~2.70 eV) (FIGS. 16G and 16H). Such bandgap value (~2.70 eV) of NanoS nanoparticle is comparable to other carbon-based quantum dot systems, such as 0 doped GQD (2.88 eV) and S, N co-doped GQD (2.5 eV). The PL spectra of NanoS-stabilized graphene dispersion showed a significantly lower PL intensity, indicating a typical quenching effect induced by the adsorption of quantum dots on graphene sheets.

Figure 17A:
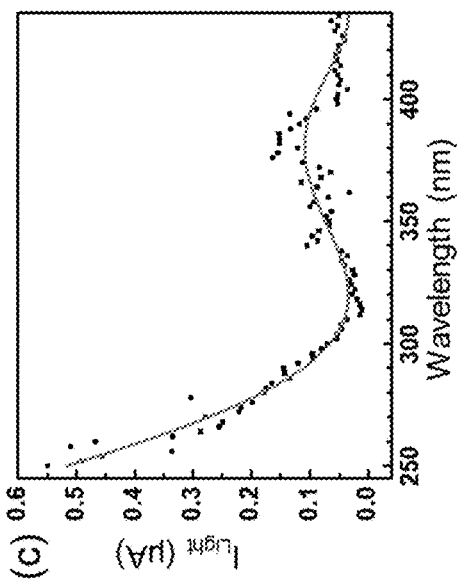
FIGS. 17A-17F show the optoelectronic property and spectroscopy of NanoS-stabilized graphene ink.
Figure 17B:
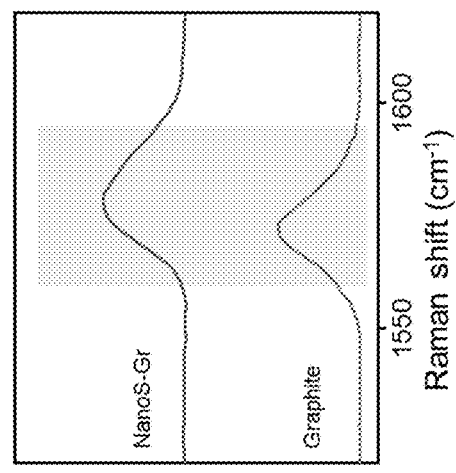

NanoS provides some unique optoelectronic properties that do not exist in the printed graphene films with conventional surfactant. The NanoS is essentially a type of semiconducting nanoparticles (FIG. 1B), while most molecular surfactants (e.g., SC) are organic and considered as electric insulators. As shown in FIG. 17A, a printed pattern of NanoS showed strong photoluminescence (PL) under UV illumination. Due to the facile adsorption of semiconducting NanoS on graphene, the NanoS-based ink formulation may enable a straightforward tool to tune the bandgaps of graphene. The Raman spectra of NanoS-Gr and pristine graphite in FIG. 17B revealed a blue shift of the G peak in the NanoS-Gr in comparison with that of the pristine graphite, indicating a non-negligible doping effect. Such doping effect was further verified using X-ray photoelectron spectroscopy (XPS) (FIGS. 16A-16H). The bandgap of NanoS is estimated using PL spectroscopy (FIGS. 16A-16H), revealing the photoluminescence peak for the pure NanoS at wavelengths of 463 nm (≈2.70 eV), which is similar to reported carbon-based quantum dots. It is worth mentioning that the bandgaps of quantum dots are tunable depending on the particle size, surface chemistry, and pH values, which might enable further tuning of the electronic/optical properties of GQD-based composites.

Figure 17C:
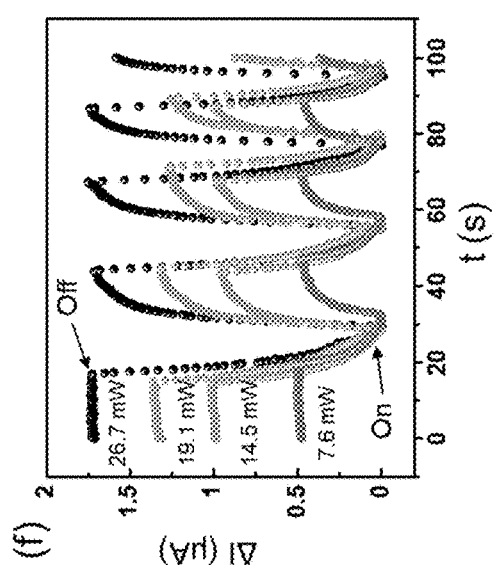
Figure 17D:
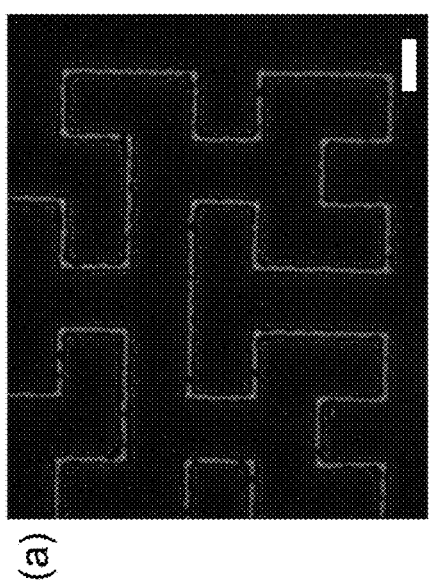

The PL spectra of NanoS-stabilized graphene dispersion shows a significantly lower PL intensity than the pure NanoS, indicating a typical quenching effect induced by the adsorption of quantum dots on graphene sheets. As shown in FIG. 17C, the spectral photocurrent response of NanoS-Gr showed an exciton peak at around 385 nm (bias voltage ($V_b$)=2.0 V), which confirms the spectral selectivity of NanoS-Gr offered by the doping effect of NanoS. It should be noted that the photocarrier generation on graphene itself is not expected to yield photoconductance because of the ultrafast recombination in graphene. This has been confirmed by a photoconductance test of graphene with/without NanoS. As shown in FIG. 17D, the generation of photocurrent ($\Delta I = I_{light} - I_{dark}$) was observed in the printed device using the NanoS-Gr ink, while the printed device using the SC-Gr ink shows no observable photocurrent. Despite similar resistivity of NanoS-Gr and SC-Gr (Table 1), the significant difference in photocurrent highlights the role of NanoS particles in improving the photoconductance of graphene.

TABLE 1

Comparison of different graphene inks

| Materials | Solvent | Substrate | Resistivity ($\Omega \cdot cm$) |
|---|---|---|---|
| NanoS-Gr | Water | Glass | 0.427 |
| NanoS-Gr annealed* | Water | Glass | 0.0595 |
| SC-Gr | Water | Glass | 0.513 |
| SC-Gr annealed* | Water | Glass | 0.0634 |

*annealing temperature: 400° C.

Figure 17E:
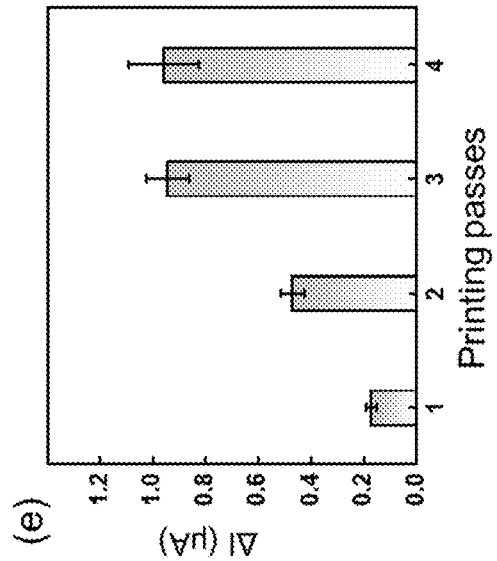
Figure 17F:
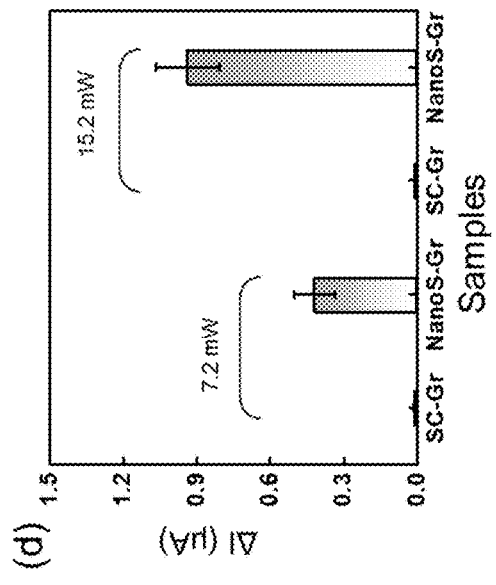

The poor photoconductance of pristine graphene results from the ultrashort lifetime and fast recombination of photogenerated excitons due to graphene's gapless nature, which limits the efficient generation of photocurrent. Thus, complicated device designs, such as p-n junction or Schottky junction, are often required to separate photocarriers and enhance the photocurrent. An increase in UV power also results in a higher photocurrent of the NanoS-Gr device. The photocurrent of NanoS-Gr devices increases with the number of printing passes and film thicknesses before reaching a saturation point (FIG. 17E), and such thickness-dependent photocurrent is also seen in GaSe photodetector. FIG. 17F shows the transient photocurrent responses of NanoS-Gr devices with different irradiation powers. The time response of the photocurrent decay is relatively slow ($\approx$2 s for 50% decay at power of 26.7 mW), which is likely due to the presence of disordered interfaces in NanoS/graphene composite. This undesired effect is found in other graphene composite systems, such as ZnO QDs/graphene, and can be largely reduced by improving the charge transfer process from QDs to graphene under optical illumination.

Example 4 Device Architectures

Prototyping Capability.

Figure 18A:
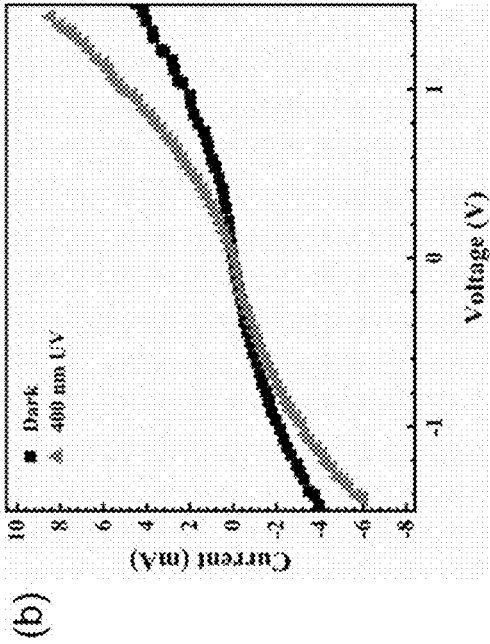
FIG. 18A shows schematic illustration of Gr/NanoS/ITO device on glass.
Figure 18B:
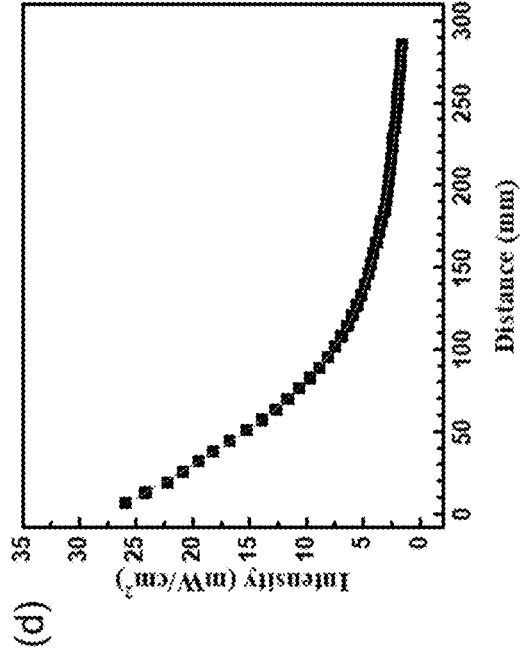
FIG. 18B shows I-V curve of Gr/NanoS/ITO device with and without UV illumination.
Figure 18C:
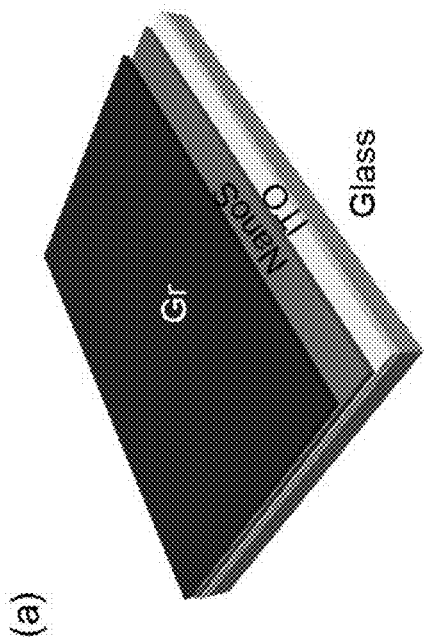
FIG. 18C shows light spectra of UV lamp.
Figure 18D:
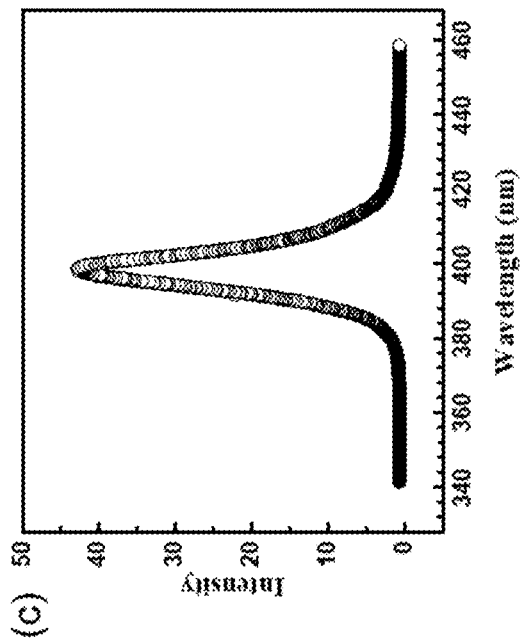
FIG. 18D shows distance-dependent intensity of UV lamp.

In addition to graphene inks, NanoS itself was integrated in device design, forming a heterojunction between printed NanoS and indium tin oxide (ITO), as shown in FIG. 18A. As graphene quantum dots and ITO commonly behave as p-type and n-type semiconductors, respectively, such heterojunction of GQD and ITO were considered as p-n junction, though only a weak rectification effect was observed (FIG. 18B). The UV illumination source used a portable UV lamp with light spectra shown in FIG. 18C, and its power intensity was estimated by establishing a distance-power relation (FIG. 18D).

Photocurrent Densities.

Figure 19C:
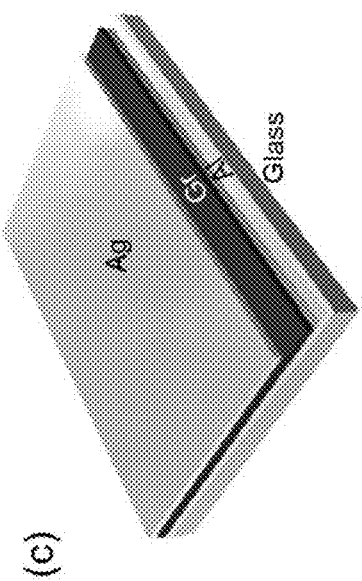
FIGS. 19A-19J show printed UV sensors on 2D and 3D substrates using NanoS-Gr ink.
Figure 19B:
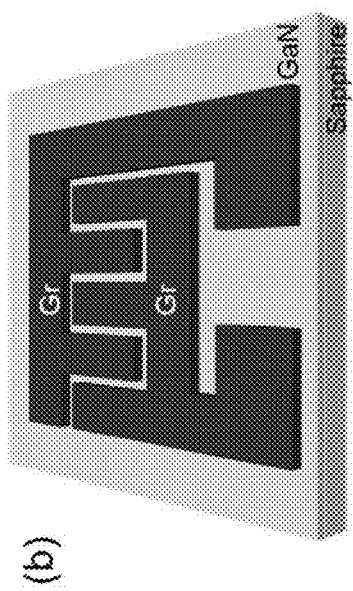
Figure 19A:
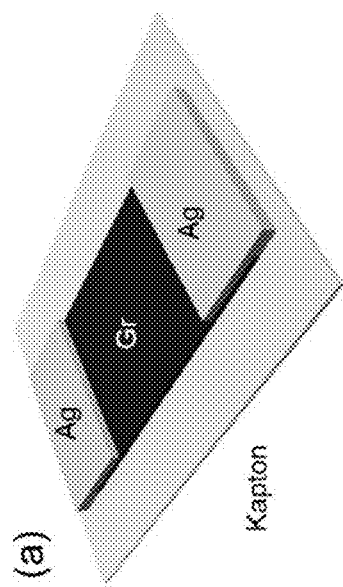

In addition to photocurrent measurements, the normalized photocurrent density (current/area) was also calculated by measuring the area exposed to UV irradiation. Three devices were prepared: two in-plane devices (Ag/NanoS-Gr/Ag irradiation area 0.2 $cm^2$, and NanoS-Gr/GaN/NanoS-Gr irradiation area 0.16 $cm^2$) and one cross-plane device (Ag/NanoS-Gr/Al, irradiation area 0.07 $cm^2$), as shown in FIGS. 19A-19C. By taking account of the UV exposed area, the normalized photocurrent densities of the devices are obtained (FIGS. 20A-20D). It was found that the photocurrent density of cross-plane device is superior than that of in-plane devices likely due to the short vertical carrier transit path that facilitates the transport of photo-generated carriers. At a bias voltage of 2V, the cross-plane devices showed a high photocurrent density of 458 μA/cm2, which is several times higher than some N-doped GQD-based nanosystems.

Printed Devices.

One of the most unique advantages of printing technology lies on the ability to rapidly convert functional nanomaterials into complex device architectures. The present NanoS-Gr ink was used to print several devices with different configurations to demonstrate this rapid prototyping capability (FIGS. 19A-19C and FIGS. 18A-18D). Specifically, NanoS-Gr was incorporated with printed silver electrodes, demonstrating an all-printed in-plane photodetector (FIG. 19A) as well as a cross-plane optoelectronic device (FIG. 19C). NanoS-Gr inks can also be printed and incorporated along with other semiconducting materials, where an optoelectronic device of NanoS-Gr/GaN/NanoS-Gr is demonstrated (FIG. 19B).

Figure 19D:
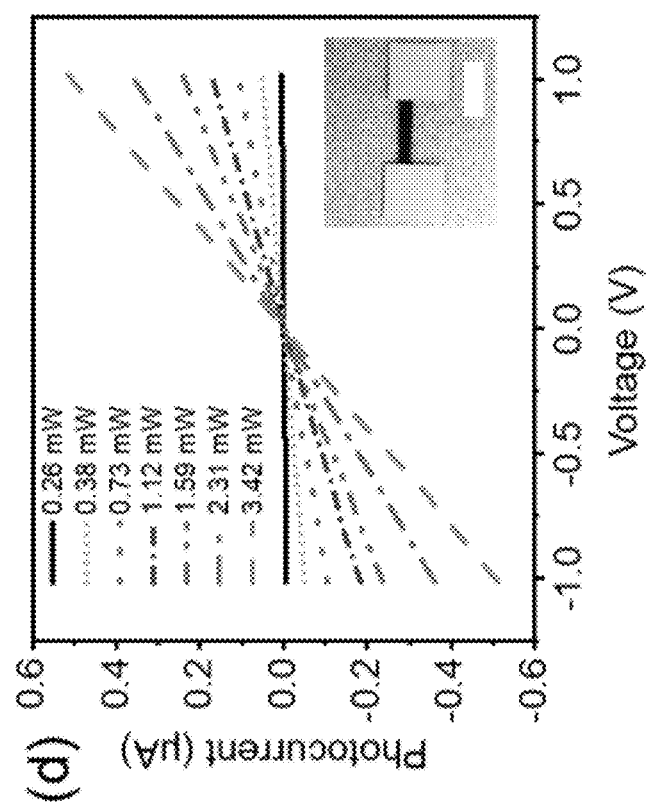
Figures 19E, 19F:
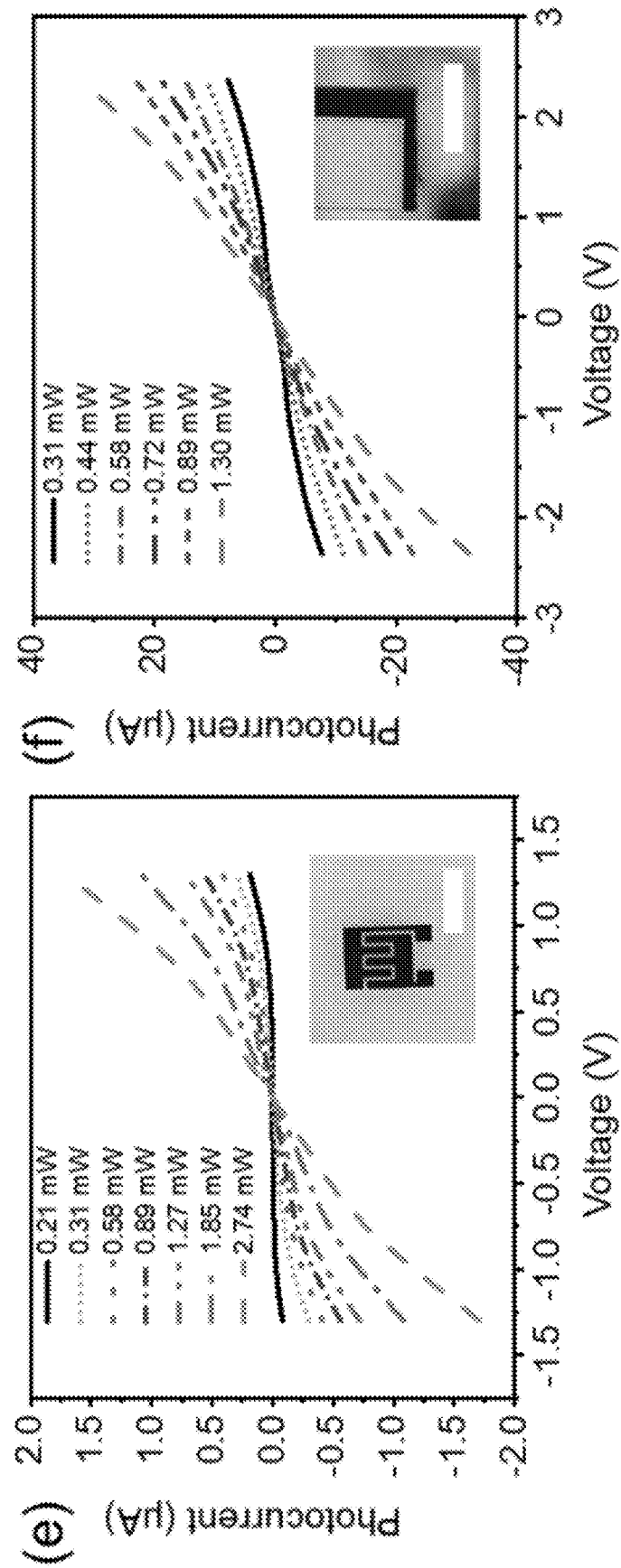

Although typical I-V curves for the Ag/NanoS-Gr/Ag photodetectors are linear and symmetric (Ohmic contact, FIG. 19D), nonlinear I-V curves are observed in NanoS-Gr/GaN/NanoS-Gr and cross-plane Ag/NanoS-Gr/Al devices (FIGS. 19E and 19F), indicating that there are contact barriers between NanoS-Gr and GaN as well as NanoS-Gr and Al electrodes. By taking account of the UV exposed area, the normalized photocurrent densities of three types of devices were obtained (FIGS. 20A-20D). At a bias voltage of 2 V, the cross-plane devices showed a high photocurrent of 32.1 μA and maximum photocurrent density of 458 μA $cm^{-2}$, which is several times higher than some reported graphene-based photodetectors, such as CdTe- or CdSe-doped graphene systems. The cross-plane devices demonstrated a superior performance compared with in-plane counterparts likely due to the short vertical carrier transit path, which facilitates the transport of photogenerated carriers.

Figure 19H:
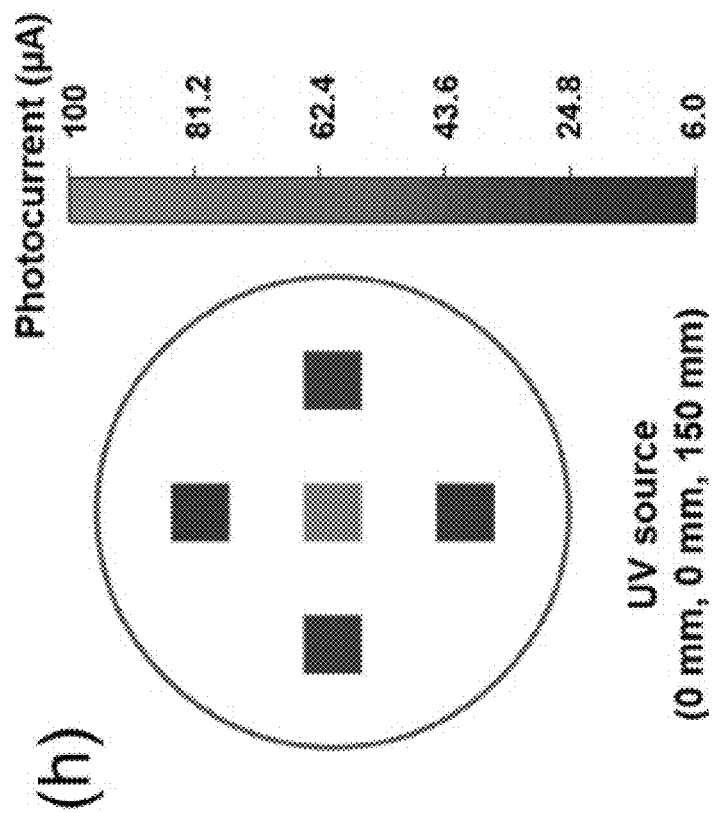
Figure 19G:
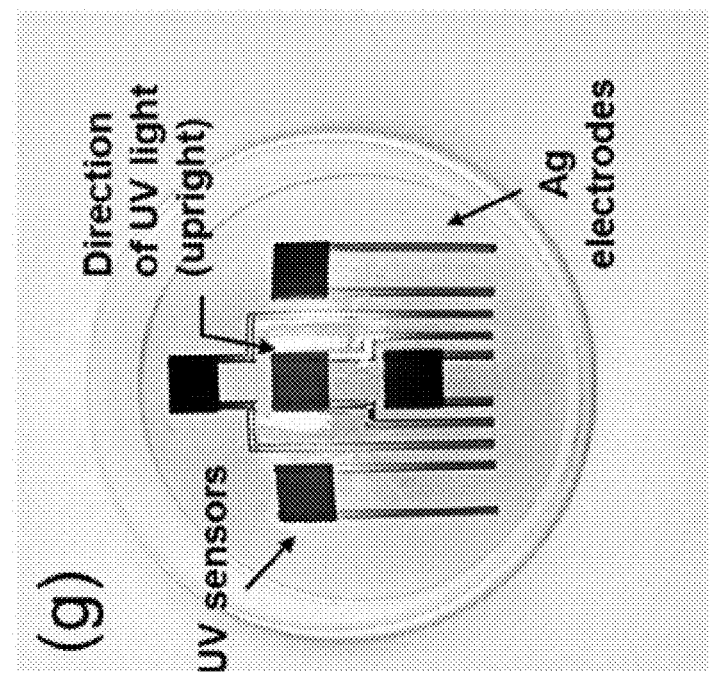
Figures 19I, 19J:
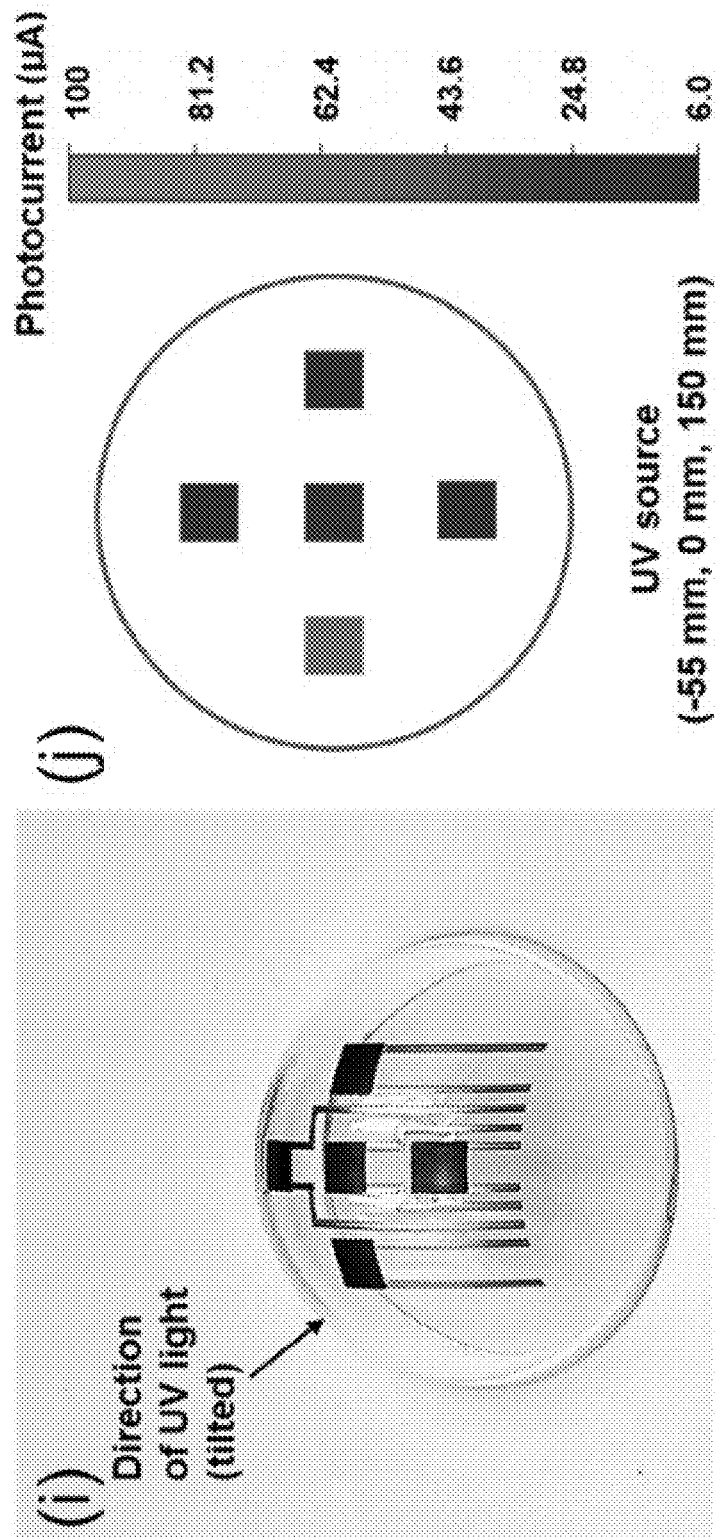
Figure 20A:
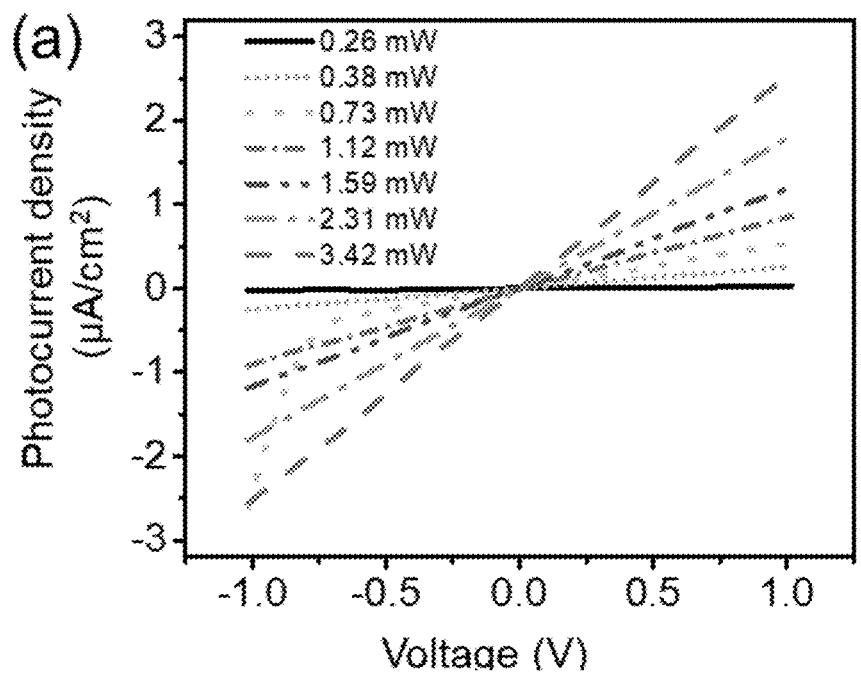
FIGS. 20A-20D show printed UV sensors on 2D and 3D substrates using NanoS-Gr ink.
Figure 20B:
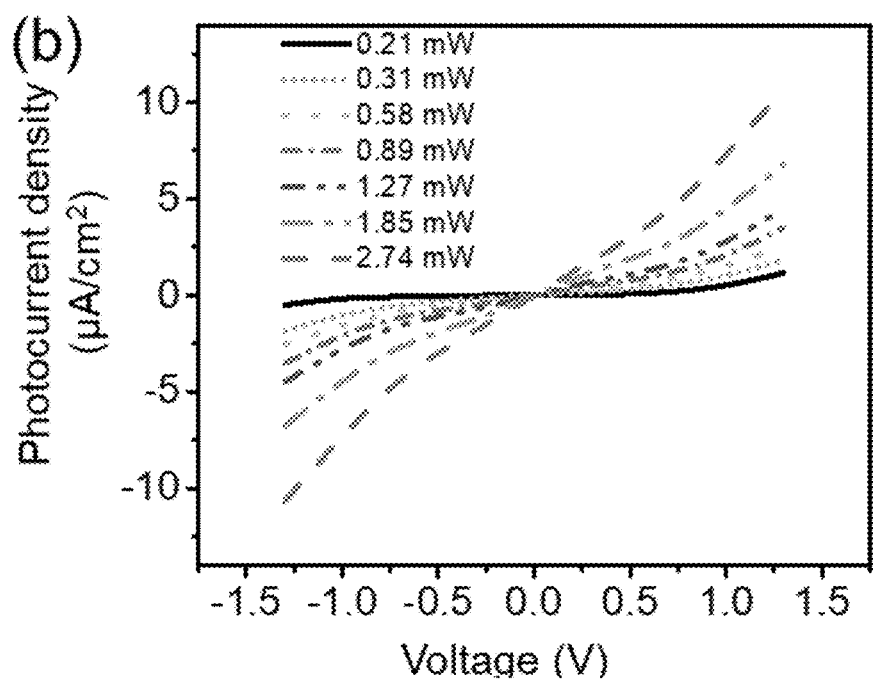
Figure 20C:
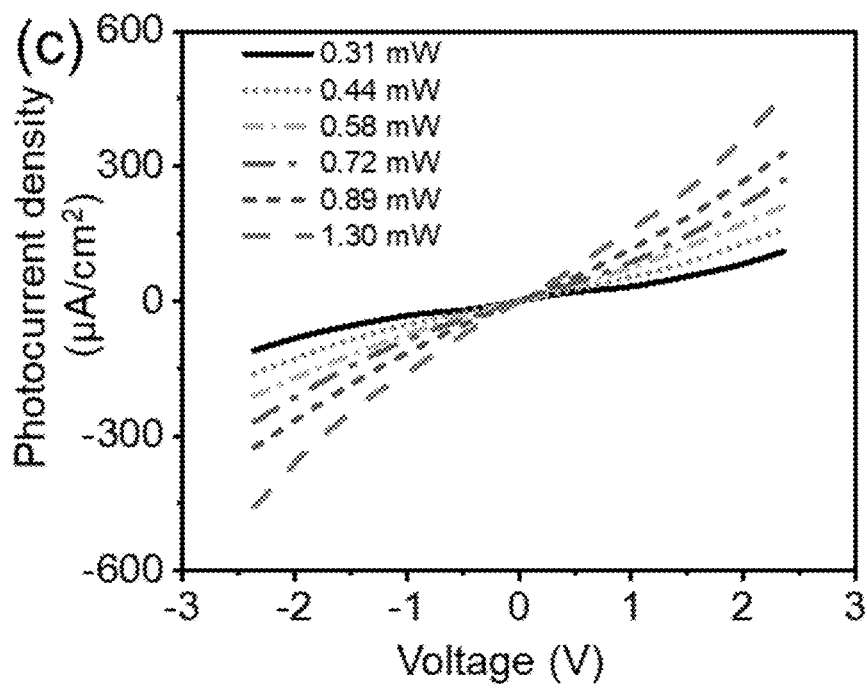
Figure 20D:
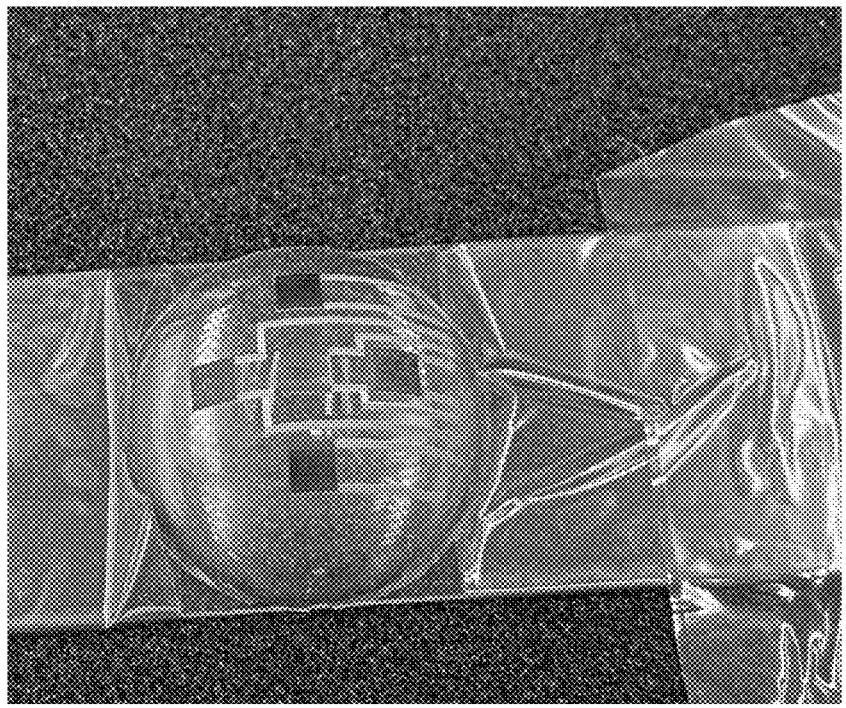
Figure 21A:
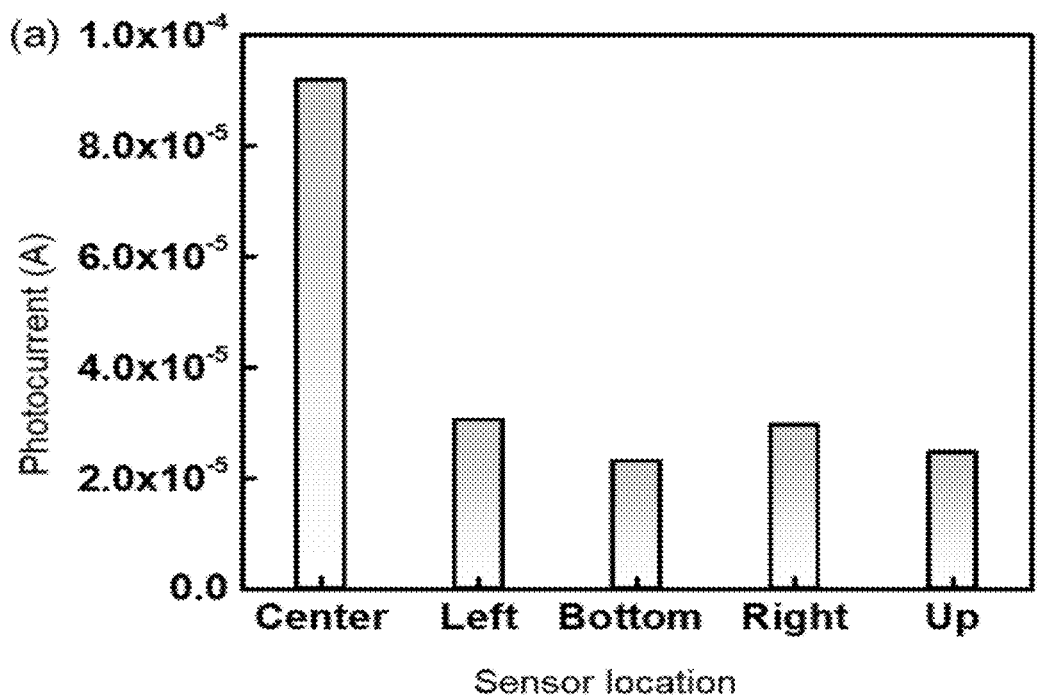
FIGS. 21A and 21B show photocurrent of printed 3D photodetector array (FIG. 21A) and the photocurrent color code (FIG. 21B) under normally-incident illumination.
Figure 21B:
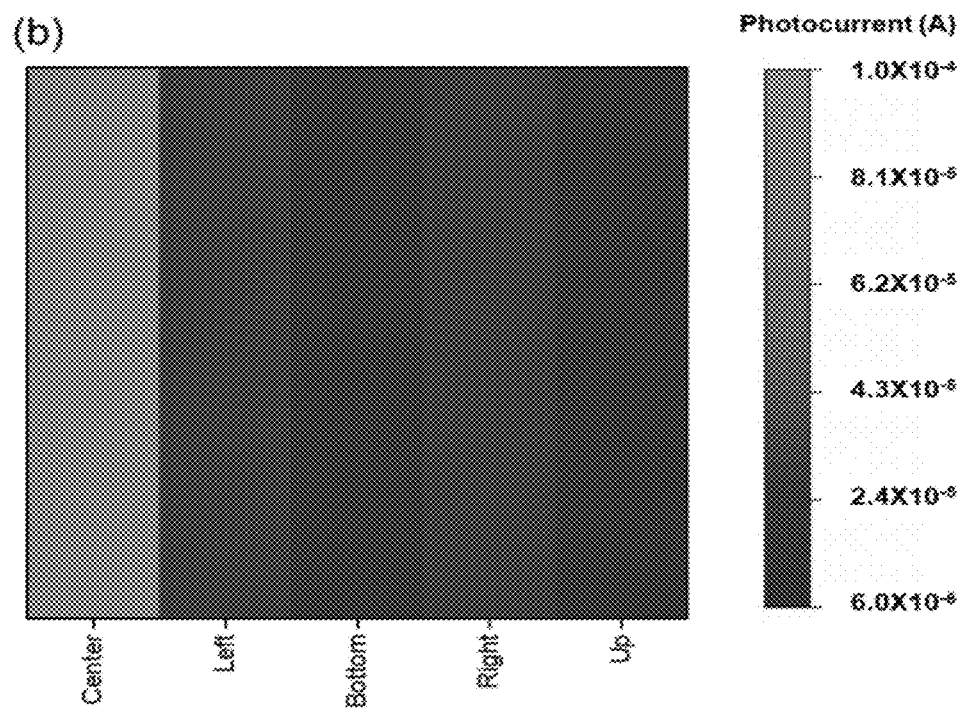
Figure 21C:
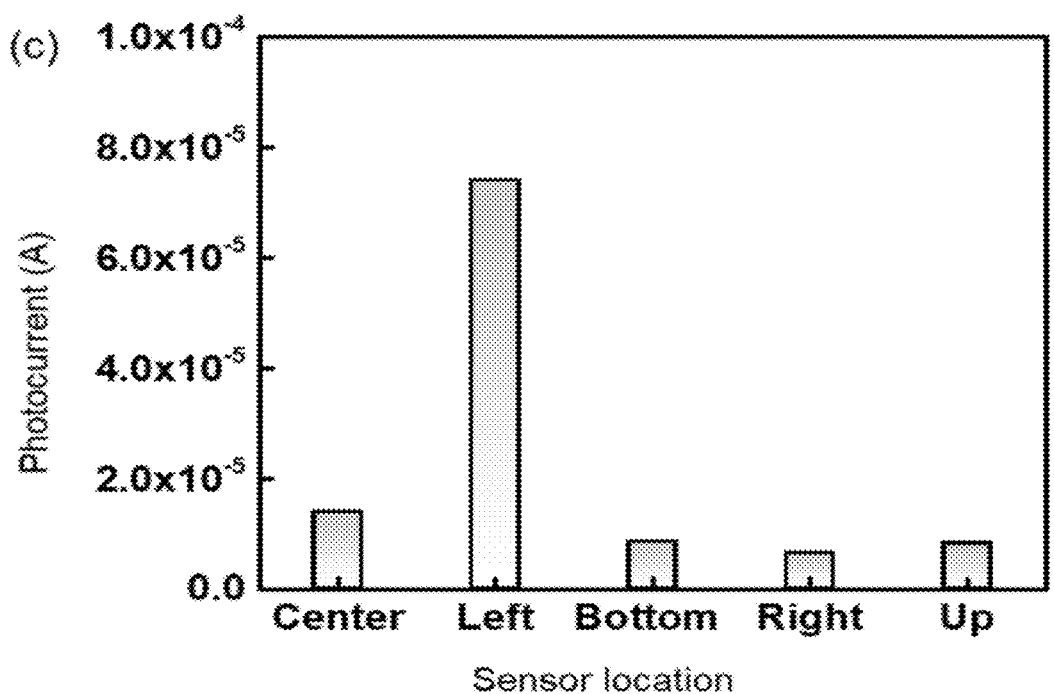
FIGS. 21C and 21D show photocurrent of 3D photodetector array (FIG. 21C) and the photocurrent color code under obliquely incident light (FIG. 21D).
Figure 21D:
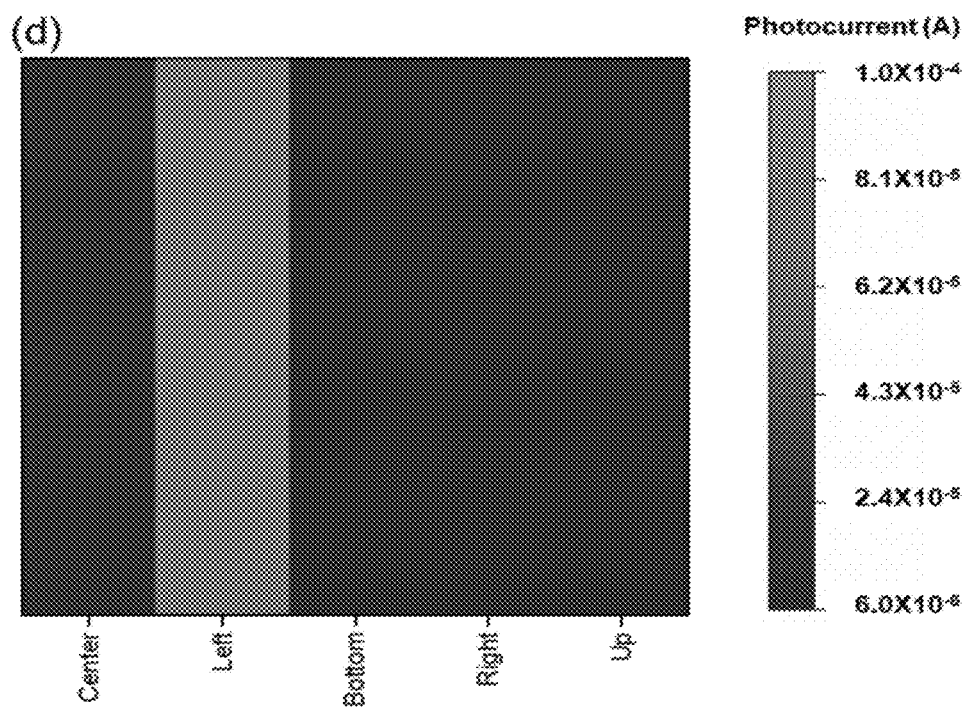

As a proof-of-concept demonstration of developing advanced 3D sensing architectures, an array of five 3D photodetector devices is conformally printed on a hemispherical glass (radius: 15 mm.) using the NanoS-Gr as the active layer and the printed silver as the electrodes (FIG. 19G). The five sensors are able to differentiate between normally incident light and obliquely incident light. When UV light is oriented such that it is normally incident on the apex of the hemispherical photodetector array (15 cm height from the reference point), the central detector exhibits a dominant photocurrent with the surrounding four detectors showing very similar photocurrents (FIG. 19H). The central detector's photocurrent (91.84 μA) is almost 300% higher than that of surrounding sensors (ranging from 22.96 to 30.04 μA). However, for obliquely incident light, a considerable change in photocurrent from the sensor array is observed (FIGS. 19I and 19J), in which the most intense response emerges in the UV-light-focused photosensor (left sensor) while other sensors show much weaker photocurrent (FIGS. 21A-21D). These results indicate that the 3D sensor array not only detects the UV light, but also provides directional information of the UV light sources. A 3D-printed UV sensor, in combination with printed visible-light or infrared sensors, may facilitate the development of nextgeneration bionic eyes that can realize all-angle, all-wavelength visualization.

In summary, these studies demonstrate an aqueous 2D material ink system that is stabilized by surface-active graphene quantum dot nanosurfactants. Thanks to the reduced interfacial tension of inks enabled by nanosurfactants, the aqueous dispersions of graphene, $MoS_2$, $WS_2$, and h-BN nanosheets are colloidally stable and can be readily used in printing processes. Similar to small-molecule surfactants, the nanosurfactant-based printing technique enables rapid fabrication of complex device structures with high spatial resolution. More importantly, nanosurfactants not only eliminates the prerequisite of thermal treatment for the removal of organic surfactants, but also becomes an integrated part of the printed device and results in unique functionalities and superior performances in printed 2D-crystal-based devices, including bandgap engineering, enhanced photoconductance of ink materials, and improved film robustness. The present disclosure offers a facile, versatile, and highly scalable approach of printing 2D nanomaterials into functional devices, with broad applications in sensors, energy conversion/storage devices, and flexible and wearable electronics.

While specific embodiments of the invention have been described, it is understood that the present invention could take on a variety of other forms. Various features and advantages of the invention are set forth in the following claims.

What is claimed is:

1. An ink composition, comprising:
   about 0.5% to about 2.0% by weight of a graphene quantum dot nanosurfactant;
   a printable material; and
   a solvent,
   wherein the printable material is dispersed in the solvent by the graphene quantum dot nanosurfactant, and
   wherein a weight ratio of the printable material to the graphene quantum dot nanosurfactant is about 0.1:1 to about 2:1.

2. The ink composition of claim 1, wherein the graphene quantum dot nanosurfactant is produced by reacting citric acid and 4-styrenesulfonic acid sodium salt.

3. The ink composition of claim 1, wherein the printable material comprises graphene, transition metal dichalcogenide (TMD), hexagonal boron nitride (h-BN), carbon nanotubes (CNT), or a combination thereof.

4. The ink composition of claim 1, comprising about 0.1% to about 2.0% by weight the printable material.

5. The ink composition of claim 1, comprising about 0.5% to about 2.0% by weight the printable material.

6. The ink composition of claim 1, wherein the solvent comprises water, ethanol, isopropanol, cyclohexanone, terpineol, ethylene glycol, or a combination thereof.

7. The ink composition of claim 1, having a Zeta potential of about −50 mV to about −65 mV.

8. An ink composition, comprising:
   greater than 0.2% by weight of a graphene quantum dot nanosurfactant;
   about 0.5% to about 2.0% by weight of a printable material; and
   a solvent,
   wherein the printable material is dispersed in the solvent by the graphene quantum dot nanosurfactant, and
   wherein a weight ratio of the printable material to the graphene quantum dot nanosurfactant is about 0.1:1 to about 2:1.

9. The ink composition of claim 8, wherein the graphene quantum dot nanosurfactant is produced by reacting citric acid and 4-styrenesulfonic acid sodium salt.

10. The ink composition of claim 8, wherein the printable material comprises graphene, transition metal dichalcogenide (TMD), hexagonal boron nitride (h-BN), carbon nanotubes (CNT), or a combination thereof.

11. The ink composition of claim 8, wherein the solvent comprises water, ethanol, isopropanol, cyclohexanone, terpineol, ethylene glycol, or a combination thereof.

* * * * *